(12) United States Patent
Chen et al.

(10) Patent No.: US 9,477,064 B1
(45) Date of Patent: Oct. 25, 2016

(54) IMAGE CAPTURING APPARATUS

(71) Applicant: LARGAN PRECISION CO., LTD., Taichung (TW)

(72) Inventors: Kuan-Ming Chen, Taichung (TW); Hsiang-Chi Tang, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/837,532

(22) Filed: Aug. 27, 2015

(30) Foreign Application Priority Data

Jul. 1, 2015 (TW) .............................. 104210625 U

(51) Int. Cl.
| H04N 5/225 | (2006.01) |
| G02B 7/14 | (2006.01) |
| G02B 13/00 | (2006.01) |
| H04N 5/335 | (2011.01) |
| G02B 27/64 | (2006.01) |
| G02B 7/02 | (2006.01) |
| G03B 17/08 | (2006.01) |
| G02B 13/18 | (2006.01) |

(52) U.S. Cl.
CPC ................. *G02B 7/14* (2013.01); *G02B 7/026* (2013.01); *G02B 13/0045* (2013.01); *G02B 13/18* (2013.01); *G02B 27/646* (2013.01); *G03B 17/08* (2013.01); *H04N 5/2254* (2013.01); *H04N 5/335* (2013.01)

(58) Field of Classification Search
CPC ............... H04N 5/222; H04N 5/2254; H04N 5/23293; H04N 5/23245; G02B 7/14; G02B 13/0045; G02B 13/18; G03B 17/08
See application file for complete search history.

(56) References Cited

U.S. PATENT DOCUMENTS

| 4,346,966 A * | 8/1982 | Nakamura ............. G02B 13/00 359/648 |
| 5,002,372 A * | 3/1991 | Tamamura ................ G02B 9/34 359/665 |
| 6,654,179 B2 | 11/2003 | Inoue |
| 2005/0071423 A1 | 3/2005 | Rajaniemi |
| 2005/0077489 A1 | 4/2005 | Knapp et al. |
| 2010/0188492 A1* | 7/2010 | Jacobsen ............ A61B 1/00188 348/68 |
| 2012/0188654 A1* | 7/2012 | Huang ...................... G02B 9/62 359/713 |

FOREIGN PATENT DOCUMENTS

| CN | 103744165 A | 4/2014 |
| TW | I322925 B | 4/2010 |

* cited by examiner

*Primary Examiner* — Abdelaaziz Tissire
(74) *Attorney, Agent, or Firm* — McClure, Qualey & Rodack, LLP

(57) ABSTRACT

An image capturing apparatus is applied in air or in a non-air medium and includes a lens assembly, an image sensor and a removable cover lens. The lens assembly includes at least one lens element. The image sensor is disposed on an image surface of the lens assembly. When the image capturing apparatus is applied in the non-air medium, the removable cover lens, the lens assembly and the image sensor are disposed along an optical axis in order from an object side to an image side.

28 Claims, 11 Drawing Sheets

IMAGE CAPTURING APPARATUS

RELATED APPLICATIONS

This application claims priority to Taiwan Application Serial Number 104210625, filed Jul. 1, 2015, which is herein incorporated by reference.

BACKGROUND

1. Technical Field

The present disclosure relates to an image capturing apparatus. More particularly, the present disclosure relates to an image capturing apparatus which is applicable to portable electronic devices.

2. Description of Related Art

In recent years, with the popularity of mobile devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

Furthermore, due to the popularity of mobile devices having camera functionalities along with the advanced manufacturing technology of lens elements and sensors, the applicable environments of the optical system can be expanded. However, when the optical system originally applied in air is used in the non-air medium such as water, the refractive power thereof becomes smaller and the back focal length thereof becomes longer. It results in unfavorable optical properties like image defocus as the optical system is used in the non-air medium.

Although the optical system applied in air and in the non-air medium has been developed, the physical size of mobile devices is usually too small for the focusing apparatus, so that it is difficult to solve the image defocus problems of the optical system applied in the non-air medium.

SUMMARY

According to one aspect of the present disclosure, an image capturing apparatus is applied in air or in a non-air medium and includes a lens assembly, an image sensor and a removable cover lens. The lens assembly includes at least one lens element. The image sensor is disposed on an image surface of the lens assembly. When the image capturing apparatus is applied in air, the lens assembly and the image sensor are disposed along an optical axis in order from an object side to an image side, or the removable cover lens, the lens assembly and the image sensor are disposed along the optical axis in order from the object side to the image side. When the image capturing apparatus is applied in the non-air medium, the removable cover lens, the lens assembly and the image sensor are disposed along the optical axis in order from the object side to the image side. When the image capturing apparatus is applied in the non-air medium, an axial distance between an object-side surface of the removable cover lens and the image sensor is TLm, a back focal length of the image capturing apparatus applied in the non-air medium is PBFm, and a back focal length of the image capturing apparatus applied in air is PBFa, the following conditions are satisfied:

$TLm<40$ mm; and $|(PBFm-PBFa)|<7$ μm.

According to another aspect of the present disclosure, an image capturing is applied in a non-air medium and includes a lens assembly, an image sensor and a housing. The lens assembly includes at least one lens element. The image sensor is disposed on an image surface of the lens assembly. The lens assembly and the image sensor are disposed in the housing. The housing includes a housing body, at least one removable cover lens and an airtight seal. The removable cover lens, the lens assembly and the image sensor are disposed along an optical axis in order from an object side to an image side. The airtight seal is for connecting the housing body and the removable cover lens. When the image capturing apparatus is applied in the non-air medium, an axial distance between an object-side surface of the removable cover lens and the image sensor is TLm, a curvature radius of the object-side surface of the removable cover lens is Rf, and a curvature radius of an image-side surface of the removable cover lens is Rr, the following conditions are satisfied:

$TLm<40$ mm; and $0.1<|(Rf-Rr)/(Rf+Rr)|$.

DETAILED DESCRIPTION

Figure 1:
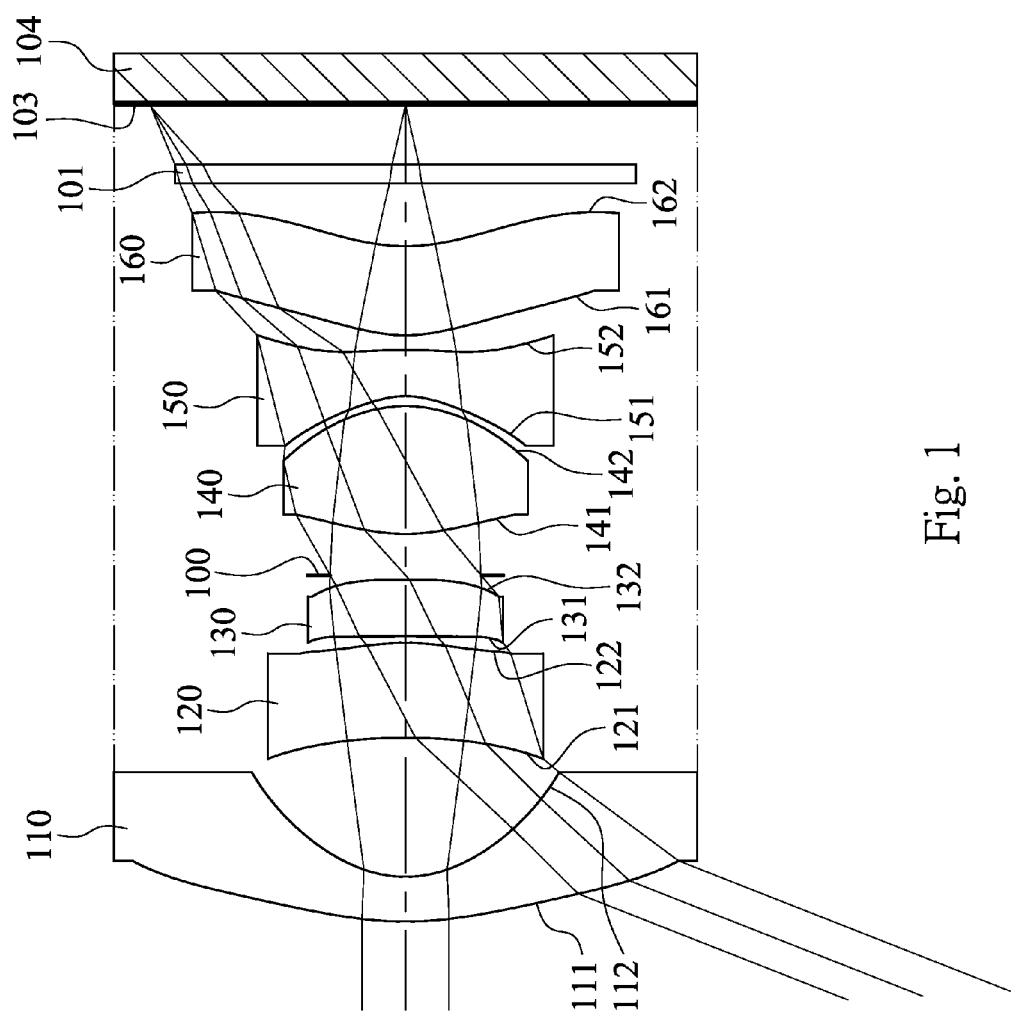
FIG. 1 is a schematic view of an image capturing apparatus applied in air according to the 1st embodiment of the present disclosure.

An image capturing apparatus is applied in air or in a non-air medium and includes a lens assembly, an image sensor and a removable cover lens. The lens assembly includes at least one lens element. The image sensor is disposed on an image surface of the lens assembly. When the image capturing apparatus is applied in air, the lens assembly and the image sensor are disposed along an optical axis in order from an object side to an image side, or the removable cover lens, the lens assembly and the image sensor are disposed along the optical axis in order from the object side to the image side. When the image capturing apparatus is applied in the non-air medium, the removable cover lens, the lens assembly and the image sensor are disposed along the optical axis in order from the object side to the image side.

According to the image capturing apparatus of the present disclosure, the removable cover lens can be disposed on the image capturing apparatus or removed from the image capturing apparatus. When the removable cover lens is disposed on the image capturing apparatus, the image capturing apparatus can be applied in air or in the non-air medium. When the removable cover lens is removed from the image capturing apparatus, the image capturing apparatus can be applied in air. Therefore, it is favorable for maintaining the convenience of use and the image quality would not be affected by the changed environment.

The aforementioned application in air is for air or vacuum environment. The aforementioned non-air medium is an environment other than air or vacuum such as water. Therefore, it is favorable for obtaining the superior image quality of image capturing apparatus in water.

In details, the image capturing apparatus of the present disclosure can further include a housing, wherein the lens assembly and the image sensor are disposed in the housing. The housing includes a housing body, the aforementioned removable cover lens and an airtight seal, wherein the airtight seal is for connecting the housing body and the removable cover lens.

According to the image capturing apparatus of the present disclosure, the airtight seal can include an o-ring with annular shape. Therefore, it is favorable for maintaining the airtight status so as to prevent the medium entering the interior of the image capturing apparatus. Furthermore, the airtight seal can further include a locking mechanism, which can be two screw threads disposed on the housing body and the removable cover lens, respectively. The two screw threads mesh correspondingly with each other to connect the housing body and the removable cover lens in airtight status. Therefore, it is favorable for maintaining the locking status of the image capturing apparatus so as to obtain stable image quality. Moreover, the o-ring can function with the locking mechanism at the same time so as to ensure an airtight connection between the housing body and the removable cover lens.

According to the image capturing apparatus of the present disclosure, an axial distance between the removable cover lens and the lens assembly applied in air can be different from an axial distance between the removable cover lens and the lens assembly applied in the non-air medium. That is, it is favorable for obtaining superb focused images of the image capturing apparatus applied in different environments by adjusting the axial distance between the removable cover lens and the lens assembly.

Furthermore, in the image capturing apparatus of the present disclosure, the removable cover lens connected to the housing body can be adjustable along the optical axis so as to adjust the axial distance between the removable cover lens and the lens assembly. In details, a user can change the axial distance between the removable cover lens and the lens assembly by adjusting the screw threads disposed correspondingly on the housing body and the removable cover lens along the optical axis, so that the image capturing apparatus can obtain focused images in air and in the non-air medium respectively without replacing or removing the removable cover lens. Therefore, it is favorable for maintaining the convenience of use and the image quality would not be affected by the environment change.

According to the image capturing apparatus of the present disclosure, the removable cover lens can have positive refractive power. Therefore, it is favorable for properly adjusting the strength of positive refractive power of the removable cover lens so as to decrease the total track length of the image capturing apparatus.

According to the image capturing apparatus of the present disclosure, at least two removable cover lenses, which are interchangeable, are able to connect to the housing body, wherein one of the removable cover lenses is applied in air, and the other one of the removable cover lenses is applied in the non-air medium. Therefore, it is favorable for maintaining the convenience of use and the image quality would not be affected by the environment change. Furthermore, at least one of the removable cover lenses can be meniscus and can have negative refractive power, wherein "meniscus" means one of an object-side surface and an image-side surface of at least one of the removable cover lenses is convex, and the other one of the object-side surface and the image-side surface of the removable cover lens is concave. Therefore, it is favorable for enlarging the field of view and the imaging scene of the image capturing apparatus.

According to the image capturing apparatus of the present disclosure, the removable cover lens can be made of plastic material. Therefore, it is favorable for effectively reducing the manufacturing costs.

According to the image capturing apparatus of the present disclosure, there are at least four and no more than nine lens elements in the lens assembly. Preferably, there are at least three and no more than seven lens elements in the lens assembly. Therefore, it is favorable for maintaining the compact size and the superb image quality of the image capturing apparatus.

Furthermore, there are at least two lens elements in the lens assembly, and at least one of the lens elements is made of glass material. Therefore, it is favorable for increasing the degree of freedom of the distribution of refractive power thereof.

According to the image capturing apparatus of the present disclosure, there can be no relative movement between the at least one lens element of the lens assembly and the image sensor. Therefore, it is favorable for reducing the misalignment with the optical axis of each lens element caused by the relative movement between the lens element and the image sensor.

According to the image capturing apparatus of the present disclosure, the image capturing apparatus can include an optical image stabilization system. Therefore, it is favorable for obtaining the stable image quality when a user is in motion.

When the image capturing apparatus is applied in the non-air medium, an axial distance between an object-side surface of the removable cover lens and the image sensor is TLm, the following condition is satisfied: TLm<40 mm. Therefore, it is favorable for maintaining the compact size of the image capturing apparatus so as to apply to portable electronic devices. Preferably, the following condition is satisfied: 1 mm<TLm<20 mm.

When a back focal length of the image capturing apparatus applied in the non-air medium is PBFm, and a back focal length of the image capturing apparatus applied in air is PBFa, the following condition is satisfied: |(PBFm−PBFa)|<7 μm. Therefore, it is favorable for obtaining focused images in the image capturing apparatus applied both in air and in the non-air medium. Preferably, the following condition is satisfied: |(PBFm−PBFa)|<5 μm.

When a maximal field of view of the image capturing apparatus applied in air is FOVa, and a maximal field of view of the image capturing apparatus applied in the non-air medium is FOVm, the following condition is satisfied: 1.20<FOVa/FOVm. Therefore, it is favorable for obtaining a desirable field of view of the image capturing apparatus applied in the non-air medium.

When the maximal field of view of the image capturing apparatus applied in air is FOVa, the following condition is satisfied: 100 degrees<FOVa. Therefore, it is favorable for enlarging the field of view and the imaging scene of the image capturing apparatus.

When a maximum effective diameter of the object-side surface of the removable cover lens is Dlf, the following condition is satisfied: Dlf<35 mm. Therefore, it is favorable for maintaining the compact size of the image capturing apparatus so as to apply to portable electronic devices.

When a curvature radius of the object-side surface of the removable cover lens is Rf, and a curvature radius of an image-side surface of the removable cover lens is Rr, the following condition is satisfied: 0.1<|(Rf−Rr)/(Rf+Rr)|. Therefore, it is favorable for obtaining sufficient field of view of the image capturing apparatus.

According to the image capturing apparatus of the present disclosure, the lens element and the removable cover lens thereof can be made of plastic or glass material. When the lens element or the removable cover lens is made of glass material, the arrangement of the refractive power of the image capturing apparatus may be more flexible to design. When the lens element or the removable cover lens is made of plastic material, the manufacturing cost can be effectively reduced. Furthermore, surfaces of lens element can be arranged to be aspheric, since the aspheric surface of the lens element is easy to form a shape other than spherical surface so as to have more controllable variables for eliminating the aberration thereof, and to further decrease the required number of the lens element. Therefore, the total track length of the image capturing apparatus can also be reduced.

According to the image capturing apparatus of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly unless otherwise specified, when the lens element or the removable cover lens has a convex surface, it can indicate that the surface is convex in the paraxial region thereof; when the lens element or the removable cover lens has a concave surface, it can indicate that the surface is concave in the paraxial region thereof. Furthermore, when the lens element or the removable cover lens has positive refractive power or negative refractive power, it can indicate that the lens element or the removable cover lens has refractive power in the paraxial region thereof. When the lens element or the removable cover lens has a focal length, it can indicate that the lens element or the removable cover lens has a focal length in the paraxial region thereof.

According to the image capturing apparatus of the present disclosure, the image capturing apparatus can include at least one stop, such as an aperture stop, a glare stop or a field stop. The glare stop or the field stop is for eliminating the stray light and thereby improving the image resolution thereof.

According to the image capturing apparatus of the present disclosure, the image surface, depending on the corresponding image sensor, can be a planar surface or a curved surface. When the image surface is a curved surface, it can particularly indicate a concave surface toward the object side.

According to the image capturing apparatus of the present disclosure, an aperture stop can be configured as a front stop or a middle stop. A front stop disposed between an imaged object and the first lens element, which is the lens element closest to the object side, can provide a longer distance between an exit pupil of the image capturing apparatus and the image surface and thereby improves the image-sensing efficiency of an image sensor. A middle stop disposed between the first lens element and the image surface is favorable for enlarging the field of view of the image capturing apparatus and thereby provides a wider field of view for the same.

Furthermore, the image capturing apparatus of the present disclosure is featured with good correction ability and high image quality, and can be applied to 3D (three-dimensional) image capturing applications, in products such as digital cameras, mobile devices, digital tablets, smart TVs, surveillance devices, motion sensing input devices, vehicle video recorders, rear view camera systems, wearable devices and other electronic imaging products.

Preferably, the image capturing apparatus can further include a barrel member, a holder member or a combination thereof.

According to the above description of the present disclosure, the following 1st-5th specific embodiments are provided for further explanation.

1st Embodiment

Figure 2:
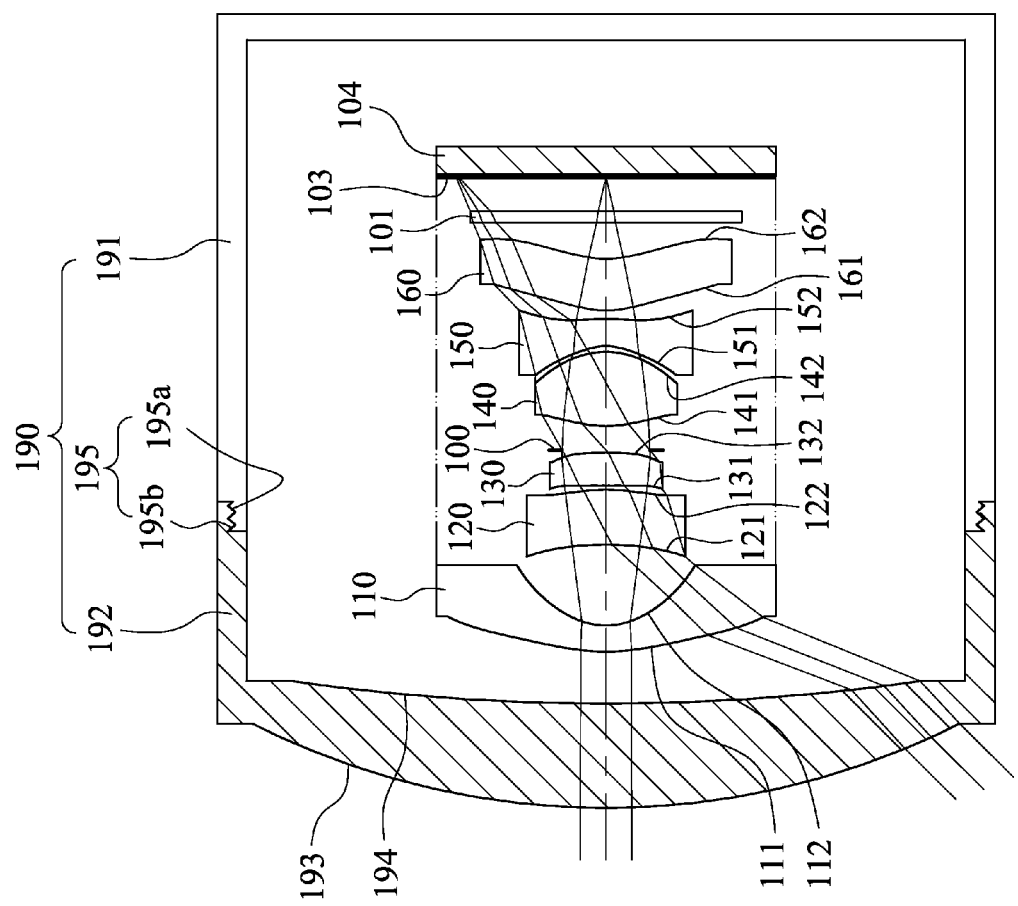
FIG. 2 is a schematic view of the image capturing apparatus applied in the non-air medium according to the 1st embodiment of the present disclosure.

FIG. 1 is a schematic view of an image capturing apparatus applied in air according to the 1st embodiment of the present disclosure. FIG. 2 is a schematic view of the image capturing apparatus applied in the non-air medium according to the 1st embodiment of the present disclosure. The image capturing apparatus according to the 1st embodiment includes a lens assembly (its reference numeral is omitted), an image sensor 104 and a housing 190. The housing 190 includes a housing body 191, a removable cover lens 192 and an airtight seal 195.

In FIG. 1, the housing 190 is a removable housing, which can be removed from the image capturing apparatus. When the housing 190 is removed from the image capturing apparatus, the lens assembly and the image sensor 104 of the image capturing apparatus are applied in air. In FIG. 2, when the housing 190 is disposed on the image capturing apparatus, the image capturing apparatus is applied in the non-air medium. According to the 1st embodiment, the non-air medium is water.

In details, the lens assembly includes, in order from an object side to an image side, a first lens element 110, a second lens element 120, a third lens element 130, an aperture stop 100, a fourth lens element 140, a fifth lens element 150, a sixth lens element 160, an IR-cut filter 101 and an image surface 103. The image sensor 104 is disposed on the image surface 103 of the lens assembly. The lens assembly has a total of six lens elements (110-160). Moreover, there is an air gap on the optical axis between every two of the first lens element 110, the second lens element 120, the third lens element 130, the fourth lens element 140, the fifth lens element 150 and the sixth lens element 160 that are adjacent to each other. There is no relative movement between the lens elements (110-160) of the lens assembly and the image sensor 104.

The first lens element 110 with negative refractive power has an object-side surface 111 being convex and an image-side surface 112 being concave. The first lens element 110 is made of plastic material and has the object-side surface 111 and the image-side surface 112 being both aspheric.

The second lens element 120 with positive refractive power has an object-side surface 121 being concave and an image-side surface 122 being convex. The second lens element 120 is made of plastic material and has the object-side surface 121 and the image-side surface 122 being both aspheric.

The third lens element 130 with positive refractive power has an object-side surface 131 being concave and an image-side surface 132 being convex. The third lens element 130 is made of plastic material and has the object-side surface 131 and the image-side surface 132 being both aspheric.

The fourth lens element 140 with positive refractive power has an object-side surface 141 being convex and an image-side surface 142 being convex. The fourth lens element 140 is made of plastic material and has the object-side surface 141 and the image-side surface 142 being both aspheric.

The fifth lens element 150 with negative refractive power has an object-side surface 151 being concave and an image-side surface 152 being convex. The fifth lens element 150 is made of plastic material and has the object-side surface 151 and the image-side surface 152 being both aspheric.

The sixth lens element 160 with positive refractive power has an object-side surface 161 being convex and an image-side surface 162 being concave. The sixth lens element 160 is made of plastic material and has the object-side surface 161 and the image-side surface 162 being both aspheric.

The IR-cut filter 101 is made of glass material and located between the sixth lens element 160 and the image surface 103, and will not affect the focal length of the lens assembly.

The equation of the aspheric surface profiles of the aforementioned lens elements of the 1st embodiment is expressed as follows:

$$X(Y) = (Y^2/R)/(1 + sqrt(1-(1+k) \times (Y/R)^2)) + \sum_i (Ai) \times (Y^i)$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

Furthermore, in FIG. 2, when the image capturing apparatus is applied in the non-air medium, the removable cover lens 192 of the housing 190 is disposed on the object side of the first lens elements 110 (i.e. between the object and the first lens elements 110). The removable cover lens 192 with positive refractive power has an object-side surface 193 being convex and an image-side surface 194 being concave. The removable cover lens 192 is made of glass material and has the object-side surface 193 and the image-side surface 194 being both spherical.

In addition, the airtight seal 195 includes a locking mechanism (its reference numeral is omitted), which includes two screw threads 195a, 195b disposed on the housing body 191 and the removable cover lens 192 respectively. The two screw threads 195a, 195b mesh correspondingly to each other for an airtight connection between the housing body 191 and the removable cover lens 192.

In the image capturing apparatus according to the 1st embodiment, when a half of a maximal field of view of the image capturing apparatus applied in air is HFOVa, and a half of a maximal field of view of the image capturing apparatus applied in the non-air medium is HFOVm, these parameters have the following values: HFOVa=68.5 degrees; and HFOVm=45.2 degrees.

In the image capturing apparatus according to the 1st embodiment, when the maximal field of view of the image capturing apparatus applied in air is FOVa, the following condition is satisfied: FOVa=137.0 degrees.

In the image capturing apparatus according to the 1st embodiment, when the maximal field of view of the image capturing apparatus applied in air is FOVa, and the maximal field of view of the image capturing apparatus applied in the non-air medium is FOVm, the following condition is satisfied: FOVa/FOVm=1.52.

In the image capturing apparatus according to the 1st embodiment, when the image capturing apparatus is applied in the non-air medium, an axial distance between the object-side surface 193 of the removable cover lens 192 and the image sensor 104 is TLm, the following condition is satisfied: TLm=12.119 mm.

In the image capturing apparatus according to the 1st embodiment, when a back focal length of the image capturing apparatus applied in the non-air medium is PBFm, and a back focal length of the image capturing apparatus applied in air is PBFa, the following condition is satisfied: |(PBFm−PBFa)|=0.794 μm.

In the image capturing apparatus according to the 1st embodiment, when a curvature radius of the object-side surface 193 of the removable cover lens 192 is Rf, and a curvature radius of the image-side surface 194 of the removable cover lens 192 is Rr, the following condition is satisfied: |(Rf−Rr)/(Rf+Rr)|=0.47.

In the image capturing apparatus according to the 1st embodiment, when a maximum effective diameter of the object-side surface 193 of the removable cover lens 192 is Dlf, the following condition is satisfied: Dlf=13.56 mm.

The detailed optical data of the 1st embodiment applied in air corresponding to FIG. 1 is shown in TABLE 1A, and the aspheric surface data is shown in TABLE 1B below. The detailed optical data of the 1st embodiment applied in the non-air medium corresponding to FIG. 2 is shown in TABLE 2A, and the aspheric surface data is shown in TABLE 2B below.

TABLE 1A

1st Embodiment Applied in Air
HFOVa = 68.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.963 | ASP | 0.500 | Plastic | 1.544 | 55.9 | −4.00 |
| 2 | | 1.344 | ASP | 1.552 | | | | |
| 3 | Lens 2 | −6.496 | ASP | 1.058 | Plastic | 1.544 | 55.9 | 7.52 |
| 4 | | −2.654 | ASP | 0.073 | | | | |
| 5 | Lens 3 | −24.361 | ASP | 0.633 | Plastic | 1.544 | 55.9 | 73.89 |
| 6 | | −15.308 | ASP | 0.050 | | | | |
| 7 | Ape. Stop | Plano | | 0.460 | | | | |
| 8 | Lens 4 | 2.147 | ASP | 1.428 | Plastic | 1.544 | 55.9 | 1.79 |
| 9 | | −1.369 | ASP | 0.110 | | | | |
| 10 | Lens 5 | −0.936 | ASP | 0.516 | Plastic | 1.639 | 23.5 | −2.02 |
| 11 | | −4.153 | ASP | 0.162 | | | | |
| 12 | Lens 6 | 1.692 | ASP | 0.994 | Plastic | 1.544 | 55.9 | 8.63 |
| 13 | | 2.098 | ASP | 0.700 | | | | |
| 14 | IR-cut filter | Plano | | 0.210 | Glass | 1.517 | 64.2 | — |
| 15 | | Plano | | 0.673 | | | | |
| 16 | Image | Plano | | — | | | | |

Reference wavelength is 587.6 nm (d-line).
Effective radius of Surface 7 is 0.840 mm.

TABLE 1B

Aspheric Coefficients

| Surface # | 1 | 2 | 3 | 4 | 5 | 6 |
|---|---|---|---|---|---|---|
| k = | −2.4546E+00 | −1.0121E+00 | 1.3690E+01 | −1.9040E+01 | 9.0000E+01 | 3.9791E+01 |
| A4 = | −1.4689E−02 | −6.0816E−04 | −1.2196E−02 | 2.0861E−02 | 5.2776E−02 | −1.7665E−01 |
| A6 = | 1.8974E−03 | −8.9044E−05 | 1.2422E−02 | 4.1589E−02 | −5.5889E−02 | 9.4758E−02 |
| A8 = | −1.0635E−04 | 4.1185E−05 | −1.5645E−04 | −2.1677E−02 | 2.1256E−02 | −6.1702E−02 |
| A10 = | 3.3025E−06 | 3.8514E−04 | −3.1952E−03 | −8.8396E−03 | −2.9422E−02 | 1.2806E−02 |
| A12 = | | | 9.4406E−04 | 3.2519E−03 | | |

| Surface # | 8 | 9 | 10 | 11 | 12 | 13 |
|---|---|---|---|---|---|---|
| k = | −4.4477E+00 | −3.2573E−01 | −4.3284E+00 | −9.0000E+01 | −6.7515E+00 | −4.7054E−01 |
| A4 = | −4.5326E−02 | 2.2606E−01 | 1.3537E−01 | 8.3111E−02 | −2.7893E−02 | −7.0179E−02 |
| A6 = | 2.2416E−02 | −3.2396E−01 | −2.7364E−01 | −1.0431E−02 | 8.9968E−03 | 1.0707E−02 |
| A8 = | −1.6128E−02 | 2.7331E−01 | 2.2612E−01 | −7.2902E−03 | −1.4395E−03 | −1.3221E−03 |
| A10 = | 5.2871E−03 | −1.1280E−01 | −9.4986E−02 | 2.5887E−03 | 1.3804E−04 | −4.0540E−06 |
| A12 = | | 1.9077E−02 | 1.5551E−02 | −2.2014E−04 | −6.6936E−06 | 1.9083E−05 |
| A14 = | | | | −5.5074E−06 | | −1.5949E−06 |

TABLE 2A

1st Embodiment Applied in the Non-Air Medium
HFOVm = 45.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Removable cover lens | 15.000 | | 2.000 | Glass | 1.517 | 64.2 | 44.04 |
| 2 | | 42.000 | | 1.000 | | | | |
| 3 | Lens 1 | 3.963 | ASP | 0.500 | Plastic | 1.544 | 55.9 | −4.00 |
| 4 | | 1.344 | ASP | 1.552 | | | | |
| 5 | Lens 2 | −6.496 | ASP | 1.058 | Plastic | 1.544 | 55.9 | 7.52 |
| 6 | | −2.654 | ASP | 0.073 | | | | |
| 7 | Lens 3 | −24.361 | ASP | 0.633 | Plastic | 1.544 | 55.9 | 73.89 |
| 8 | | −15.308 | ASP | 0.050 | | | | |
| 9 | Ape. Stop | Plano | | 0.460 | | | | |
| 10 | Lens 4 | 2.147 | ASP | 1.428 | Plastic | 1.544 | 55.9 | 1.79 |
| 11 | | −1.369 | ASP | 0.110 | | | | |
| 12 | Lens 5 | −0.936 | ASP | 0.516 | Plastic | 1.639 | 23.5 | −2.02 |

TABLE 2A-continued

1st Embodiment Applied in the Non-Air Medium
HFOVm = 45.2 deg.

| Surface # | | Curvature Radius | Thickness | Material | Index | Abbe # | Focal Length |
|---|---|---|---|---|---|---|---|
| 13 | | −4.153 ASP | 0.162 | | | | |
| 14 | Lens 6 | 1.692 ASP | 0.994 | Plastic | 1.544 | 55.9 | 8.63 |
| 15 | | 2.098 ASP | 0.700 | | | | |
| 16 | IR-cut filter | Plano | 0.210 | Glass | 1.517 | 64.2 | — |
| 17 | | Plano | 0.673 | | | | |
| 18 | Image | Plano | — | | | | |

Reference wavelength is 587.6 nm (d-line).
Effective radius of Surface 9 is 0.840 mm.

TABLE 2B

Aspheric Coefficients

| Surface # | 3 | 4 | 5 | 6 | 7 | 8 |
|---|---|---|---|---|---|---|
| k = | −2.4546E+00 | −1.0121E+00 | 1.3690E+01 | −1.9040E+01 | 9.0000E+01 | 3.9791E+01 |
| A4 = | −1.4689E−02 | −6.0816E−04 | −1.2196E−02 | 2.0861E−02 | 5.2776E−02 | −1.7665E−01 |
| A6 = | 1.8974E−03 | −8.9044E−05 | 1.2422E−02 | 4.1589E−02 | −5.5889E−02 | 9.4758E−02 |
| A8 = | −1.0635E−04 | 4.1185E−05 | −1.5645E−04 | −2.1677E−02 | 2.1256E−02 | −6.1702E−02 |
| A10 = | 3.3025E−06 | 3.8514E−04 | −3.1952E−03 | −8.8396E−03 | −2.9422E−02 | 1.2806E−02 |
| A12 = | | | 9.4406E−04 | 3.2519E−03 | | |

| Surface # | 10 | 11 | 12 | 13 | 14 | 15 |
|---|---|---|---|---|---|---|
| k = | −4.4477E+00 | −3.2573E−01 | −4.3284E+00 | −9.0000E+01 | −6.7515E+00 | −4.7054E−01 |
| A4 = | −4.5326E−02 | 2.2606E−01 | 1.3537E−01 | 8.3111E−02 | −2.7893E−02 | −7.0179E−02 |
| A6 = | 2.2416E−02 | −3.2396E−01 | −2.7364E−01 | −1.0431E−02 | 8.9968E−03 | 1.0707E−02 |
| A8 = | −1.6128E−02 | 2.7331E−01 | 2.2612E−01 | −7.2902E−03 | −1.4395E−03 | −1.3221E−03 |
| A10 = | 5.2871E−03 | −1.1280E−01 | −9.4986E−02 | 2.5887E−03 | 1.3804E−04 | −4.0540E−06 |
| A12 = | | 1.9077E−02 | 1.5551E−02 | −2.2014E−04 | −6.6936E−06 | 1.9083E−05 |
| A14 = | | | | −5.5074E−06 | | −1.5949E−06 |

In TABLE 1A and TABLE 2A, the curvature radius, the thickness and the focal length are shown in millimeters (mm). Surface numbers 0-18 represent the surfaces sequentially arranged from the object-side to the image-side along the optical axis. In TABLE 1B and TABLE 2B, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as TABLE 1A, TABLE 1B, TABLE 2A and TABLE 2B of the 1st embodiment. Therefore, an explanation in this regard will not be provided again.

2nd Embodiment

Figure 3:
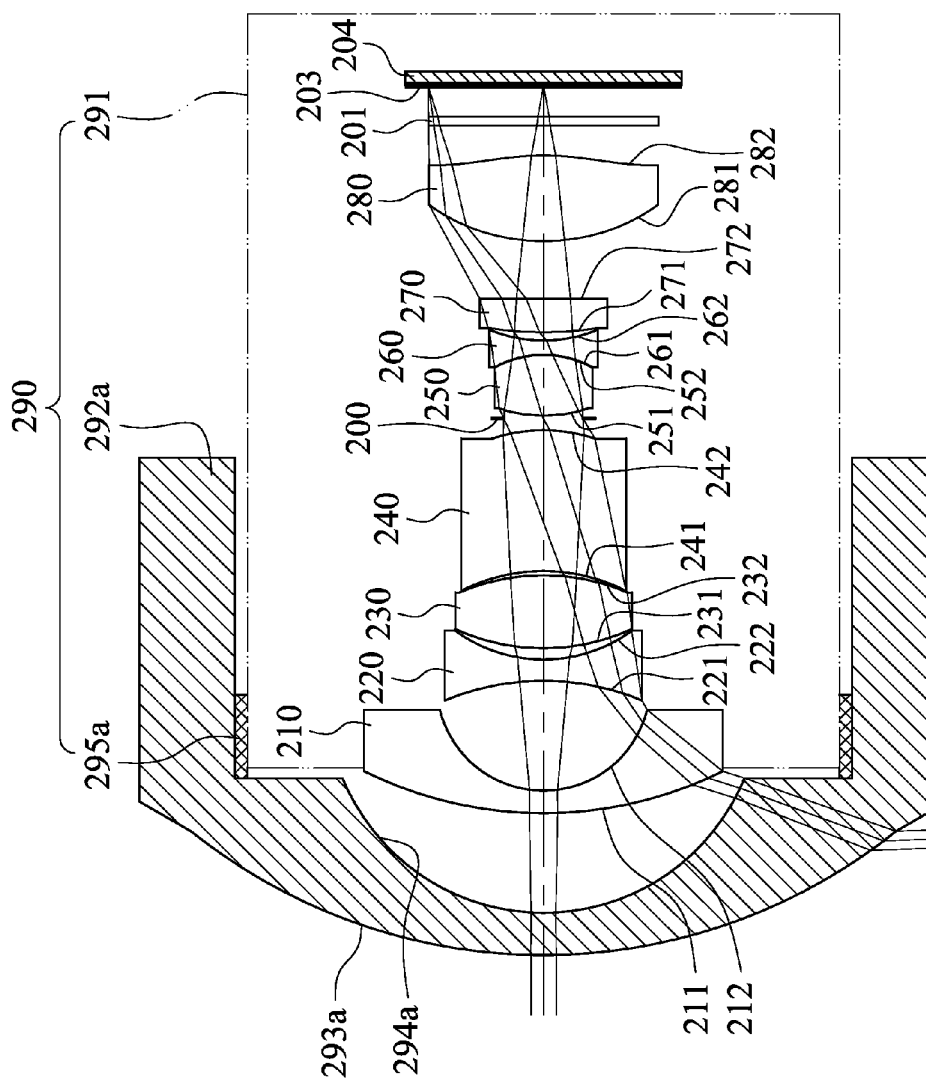
FIG. 3 is a schematic view of an image capturing apparatus applied in air according to the 2nd embodiment of the present disclosure.
Figure 4:
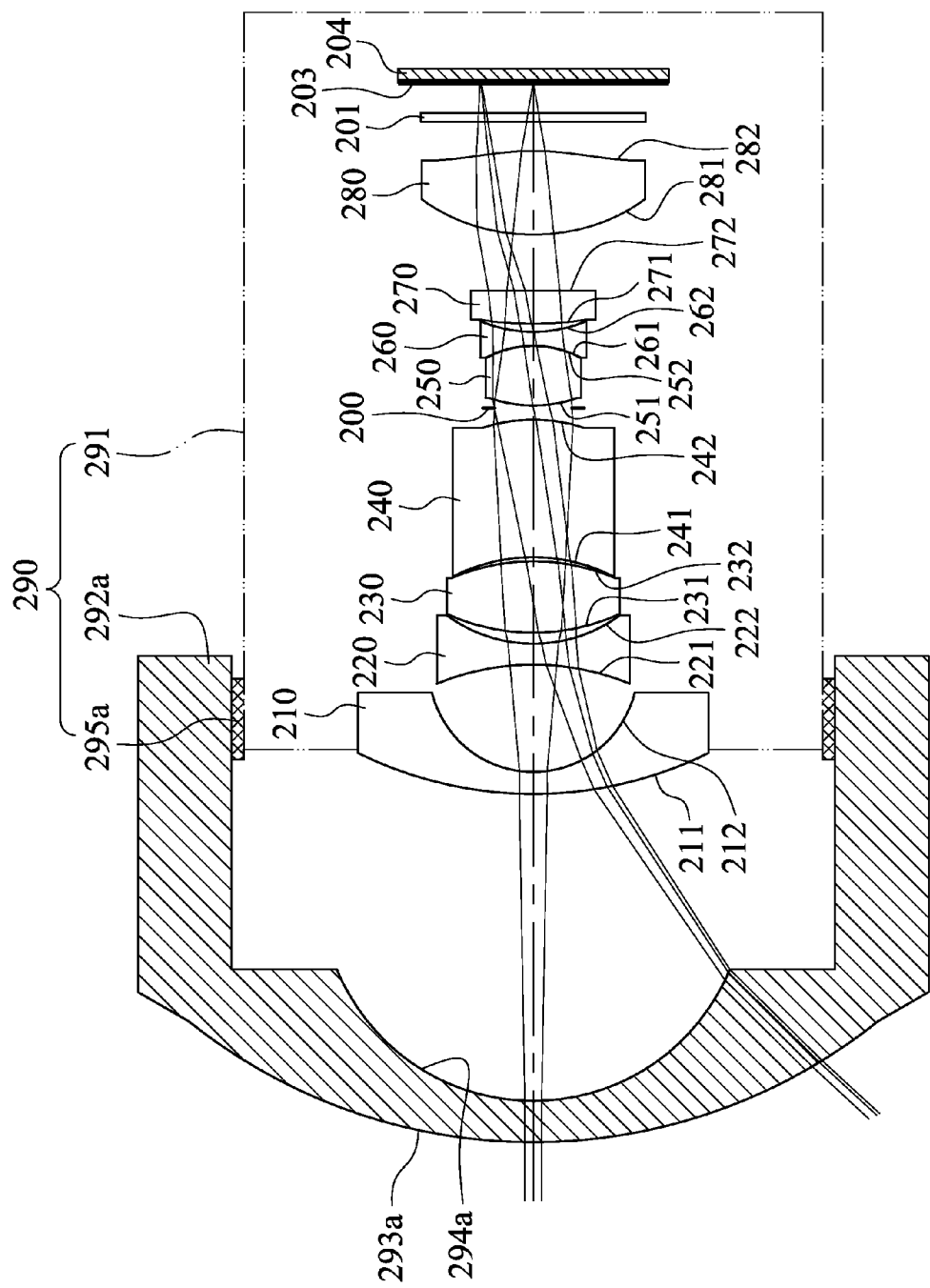
FIG. 4 is a schematic view of the image capturing apparatus applied in the non-air medium according to the 2nd embodiment of the present disclosure.
Figure 5:
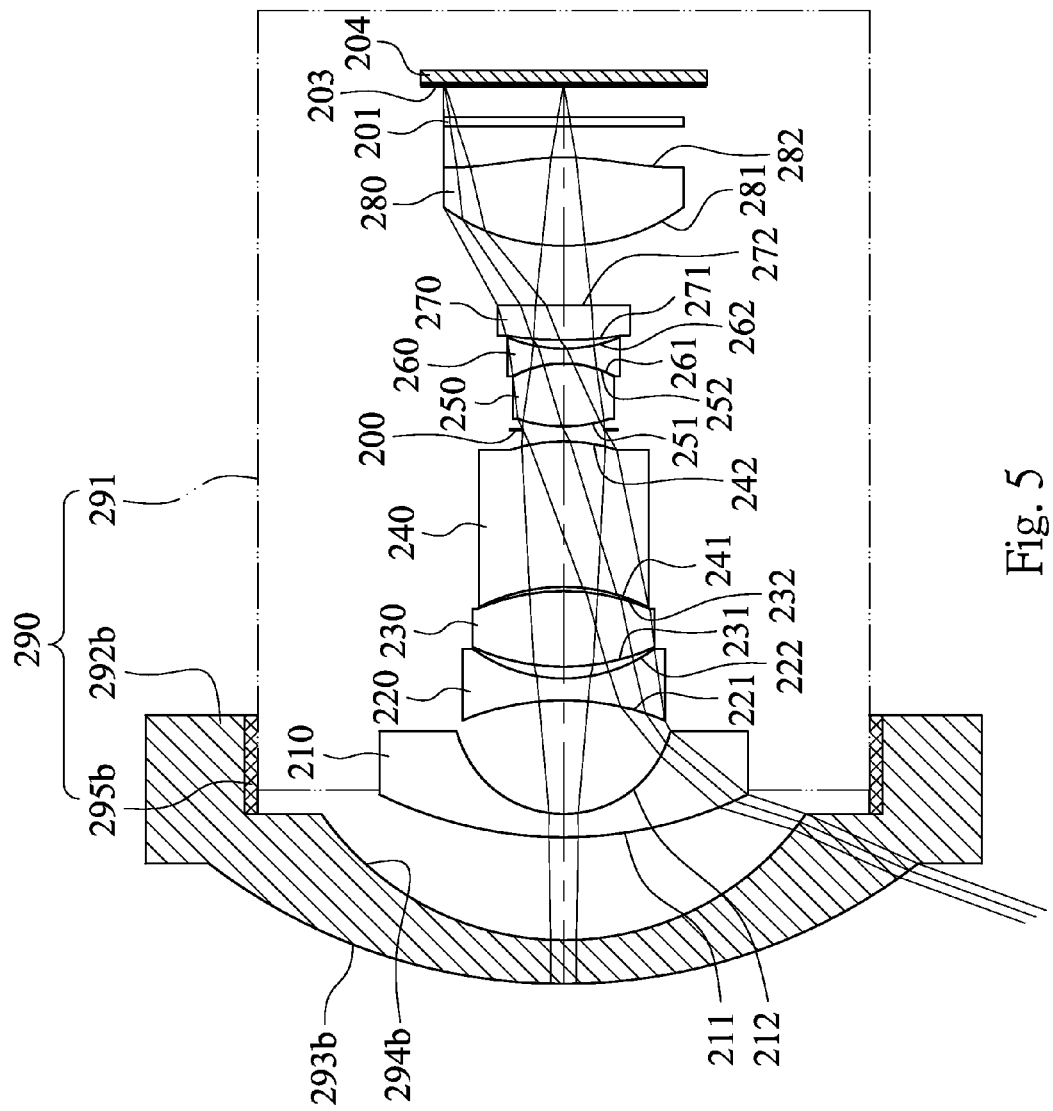
FIG. 5 is another schematic view of the image capturing apparatus applied in the non-air medium according to the 2nd embodiment of the present disclosure.

FIG. 3 is a schematic view of an image capturing apparatus applied in air according to the 2nd embodiment of the present disclosure. FIG. 4 is a schematic view of the image capturing apparatus applied in the non-air medium according to the 2nd embodiment of the present disclosure. FIG. 5 is another schematic view of the image capturing apparatus applied in the non-air medium according to the 2nd embodiment of the present disclosure. The image capturing apparatus according to the 2nd embodiment includes a lens assembly (its reference numeral is omitted), an image sensor 204 and a housing 290. The housing 290 includes a housing body 291, two removable cover lenses 292a, 292b, and two airtight seals (its reference numeral is omitted).

In FIG. 3, when the removable cover lens 292a is disposed on the image capturing apparatus, the image capturing apparatus is applied in air. In FIG. 4, the removable cover lens 292a is connected to the housing body 291 and adjustable along the optical axis. An axial distance between the removable cover lens 292a and the lens assembly is adjustable so that the image capturing apparatus is applied in the non-air medium. That is, the axial distance between the removable cover lens 292a and the lens assembly applied in air (as FIG. 3) is different from the axial distance between the removable cover lens 292a and the lens assembly applied in the non-air medium. The image capturing apparatus obtains focused images in air and in the non-air medium respectively by adjusting the axial distance between the removable cover lens 292a and the lens assembly without replacing or removing the removable cover lens 292a. Further in FIG. 5, when the removable cover lens 292b is disposed on the image capturing apparatus, wherein the removable cover lens 292a is replaced by the removable cover lens 292b, the image capturing apparatus is applied in the non-air medium. According to the 2nd embodiment, the non-air medium is water.

In details, the lens assembly includes, in order from an object side to an image side, a first lens element 210, a second lens element 220, a third lens element 230, a fourth lens element 240, an aperture stop 200, a fifth lens element 250, a sixth lens element 260, a seventh lens element 270, an eighth lens element 280, an IR-cut filter 201 and an image surface 203. The image sensor 204 is disposed on the image surface 203 of the lens assembly. The lens assembly has a total of eight lens elements (210-280). Moreover, there is no relative movement between the lens elements (210-280) of the lens assembly and the image sensor 204.

The first lens element 210 with negative refractive power has an object-side surface 211 being convex and an image-side surface 212 being concave. The first lens element 210 is made of glass material and has the object-side surface 211 and the image-side surface 212 being both spherical.

The second lens element 220 with negative refractive power has an object-side surface 221 being concave and an image-side surface 222 being concave. The second lens element 220 is made of glass material and has the object-side surface 221 and the image-side surface 222 being both spherical.

The third lens element 230 with positive refractive power has an object-side surface 231 being convex and an image-side surface 232 being convex. The third lens element 230 is made of glass material and has the object-side surface 231 and the image-side surface 232 being both spherical.

The fourth lens element 240 with positive refractive power has an object-side surface 241 being concave and an image-side surface 242 being convex. The fourth lens element 240 is made of glass material and has the object-side surface 241 and the image-side surface 242 being both spherical.

The fifth lens element 250 with positive refractive power has an object-side surface 251 being convex and an image-side surface 252 being convex. The fifth lens element 250 is made of glass material and has the object-side surface 251 and the image-side surface 252 being both spherical.

The sixth lens element 260 with negative refractive power has an object-side surface 261 being concave and an image-side surface 262 being concave. The sixth lens element 260 is made of glass material and has the object-side surface 261 and the image-side surface 262 being both spherical.

The seventh lens element 270 with positive refractive power has an object-side surface 271 being convex and an image-side surface 272 being concave. The seventh lens element 270 is made of glass material and has the object-side surface 271 and the image-side surface 272 being both spherical.

The eighth lens element 280 with positive refractive power has an object-side surface 281 being convex and an image-side surface 282 being convex. The eighth lens element 280 is made of plastic material and has the object-side surface 281 and the image-side surface 282 being both aspheric.

The IR-cut filter 201 is made of glass material and located between the eighth lens element 280 and the image surface 203, and will not affect the focal length of the lens assembly.

Furthermore, in FIG. 3 and FIG. 4, when the image capturing apparatus is applied in air and in the non-air medium, the removable cover lens 292a is disposed on the object side of the first lens elements 210 (i.e. between the object and the first lens elements 210). The removable cover lens 292a is meniscus and has negative refractive power, an object-side surface 293a being convex and an image-side surface 294a being concave. The removable cover lens 292a is made of glass material and has the object-side surface 293a and the image-side surface 294a being both spherical.

In FIG. 5, when the image capturing apparatus is applied in the non-air medium, the removable cover lens 292b is disposed on the object side of the first lens elements 210. The removable cover lens 292b is meniscus and has negative refractive power, an object-side surface 293b being convex and an image-side surface 294b being concave. The removable cover lens 292b is made of plastic material and has the object-side surface 293b and the image-side surface 294b being both spherical.

In addition, the airtight seals include two o-rings 295a, 295b disposed on the removable cover lens 292a, 292b respectively for an airtight connection between the housing body 291 and the removable cover lens 292a, 292b, respectively.

The detailed optical data of the 2nd embodiment applied in air corresponding to FIG. 3 is shown in TABLE 3A, and the aspheric surface data is shown in TABLE 3B below. The detailed optical data of the 2nd embodiment applied in the non-air medium corresponding to FIG. 4 (the removable cover lens 292a disposed) is shown in TABLE 4A, and the aspheric surface data is shown in TABLE 4B below. The detailed optical data of the 2nd embodiment applied in the non-air medium corresponding to FIG. 5 (the removable cover lens 292b disposed) is shown in TABLE 5A, and the aspheric surface data is shown in TABLE 5B below.

TABLE 3A

2nd Embodiment Applied in Air
HFOVa = 92.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Removable cover lens | 18.838 | 1.413 | Glass | 1.517 | 64.2 | −23.88 |
| 2 | | 7.266 | 3.335 | | | | |
| 3 | Lens 1 | 13.490 | 0.754 | Glass | 1.729 | 54.5 | −6.89 |
| 4 | | 3.574 | 3.683 | | | | |
| 5 | Lens 2 | −8.539 | 0.706 | Glass | 1.517 | 64.2 | −5.98 |
| 6 | | 4.975 | 0.376 | | | | |
| 7 | Lens 3 | 7.076 | 2.451 | Glass | 1.834 | 37.3 | 4.60 |
| 8 | | −7.076 | 0.143 | | | | |
| 9 | Lens 4 | −5.969 | 4.709 | Glass | 1.517 | 64.2 | 28.77 |
| 10 | | −5.404 | 0.387 | | | | |
| 11 | Ape. Stop | Plano | 0.094 | | | | |
| 12 | Lens 5 | 4.554 | 2.039 | Glass | 1.603 | 60.6 | 3.56 |
| 13 | Lens 6 | −3.375 | 0.471 | Glass | 1.699 | 30.2 | −2.73 |
| 14 | | 4.660 | 0.278 | | | | |
| 15 | Lens 7 | 11.998 | 1.129 | Glass | 1.729 | 54.5 | 16.74 |
| 16 | | 670.707 | 1.923 | | | | |
| 17 | Lens 8 | 7.053 ASP | 2.864 | Plastic | 1.514 | 56.8 | 8.17 |

TABLE 3A-continued

2nd Embodiment Applied in Air
HFOVa = 92.1 deg.

| Surface # | | Curvature Radius | | Thickness | Material | Index | Abbe # | Focal Length |
|---|---|---|---|---|---|---|---|---|
| 18 | | −8.936 | ASP | 1.000 | | | | |
| 19 | IR-cut filter | Plano | | 0.300 | Glass | 1.517 | 64.2 | — |
| 20 | | Plano | | 1.057 | | | | |
| 21 | Image | Plano | | — | | | | |

Reference wavelength is 587.6 nm (d-line).
Effective radius of Surface 2 is 6.720 mm.
Effective radius of Surface 11 is 1.324 mm.

TABLE 3B

Aspheric Coefficients

| Surface # | 17 | 18 |
|---|---|---|
| k = | 1.6550E−01 | 2.4119E+00 |
| A4 = | 2.8523E−04 | 3.2268E−03 |
| A6 = | 3.1698E−06 | 2.6770E−17 |

TABLE 3B-continued

Aspheric Coefficients

| Surface # | 17 | 18 |
|---|---|---|
| A8 = | −5.1944E−22 | 5.3881E−24 |
| A10 = | −4.3444E−27 | −3.9492E−29 |

TABLE 4A

2nd Embodiment Applied in the Non-Air Medium (Corresponding to FIG. 4)
HFOVm = 47.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Removable cover lens | 18.838 | | 1.413 | Glass | 1.514 | 56.8 | −23.88 |
| 2 | | 7.266 | | 10.510 | | | | |
| 3 | Lens 1 | 13.490 | | 0.754 | Glass | 1.729 | 54.5 | −6.89 |
| 4 | | 3.574 | | 3.683 | | | | |
| 5 | Lens 2 | −8.539 | | 0.706 | Glass | 1.517 | 64.2 | −5.98 |
| 6 | | 4.975 | | 0.376 | | | | |
| 7 | Lens 3 | 7.076 | | 2.451 | Glass | 1.834 | 37.3 | 4.60 |
| 8 | | −7.076 | | 0.143 | | | | |
| 9 | Lens 4 | −5.969 | | 4.709 | Glass | 1.517 | 64.2 | 28.77 |
| 10 | | −5.404 | | 0.387 | | | | |
| 11 | Ape. Stop | Plano | | 0.094 | | | | |
| 12 | Lens 5 | 4.554 | | 2.039 | Glass | 1.603 | 60.6 | 3.56 |
| 13 | Lens 6 | −3.375 | | 0.471 | Glass | 1.699 | 30.2 | −2.73 |
| 14 | | 4.660 | | 0.278 | | | | |
| 15 | Lens 7 | 11.998 | | 1.129 | Glass | 1.729 | 54.5 | 16.74 |
| 16 | | 670.707 | | 1.923 | | | | |
| 17 | Lens 8 | 7.053 | ASP | 2.864 | Plastic | 1.514 | 56.8 | 8.17 |
| 18 | | −8.936 | ASP | 1.000 | | | | |
| 19 | IR-cut filter | Plano | | 0.300 | Glass | 1.517 | 64.2 | — |
| 20 | | Plano | | 1.057 | | | | |
| 21 | Image | Plano | | — | | | | |

Reference wavelength is 587.6 nm (d-line).
Effective radius of Surface 2 is 6.720 mm.
Effective radius of Surface 11 is 1.324 mm.

TABLE 4B

Aspheric Coefficients

| Surface # | 17 | 18 |
|---|---|---|
| k = | 1.6550E−01 | 2.4119E+00 |
| A4 = | 2.8523E−04 | 3.2268E−03 |
| A6 = | 3.1698E−06 | 2.6770E−17 |
| A8 = | −5.1944E−22 | 5.3881E−24 |
| A10 = | −4.3444E−27 | −3.9492E−29 |

TABLE 5A

2nd Embodiment Applied in the Non-Air Medium (Corresponding to FIG. 5)
HFOVm = 69.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Removable cover lens | 18.838 | 1.413 | Plastic | 1.491 | 59.9 | −41.53 |
| 2 | | 9.553 | 3.335 | | | | |
| 3 | Lens 1 | 13.490 | 0.754 | Glass | 1.729 | 54.5 | −6.89 |
| 4 | | 3.574 | 3.683 | | | | |
| 5 | Lens 2 | −8.539 | 0.706 | Glass | 1.517 | 64.2 | −5.98 |
| 6 | | 4.975 | 0.376 | | | | |
| 7 | Lens 3 | 7.076 | 2.451 | Glass | 1.834 | 37.3 | 4.60 |
| 8 | | −7.076 | 0.143 | | | | |
| 9 | Lens 4 | −5.969 | 4.709 | Glass | 1.517 | 64.2 | 28.77 |
| 10 | | −5.404 | 0.387 | | | | |
| 11 | Ape. Stop | Plano | 0.094 | | | | |
| 12 | Lens 5 | 4.554 | 2.039 | Glass | 1.603 | 60.6 | 3.56 |
| 13 | Lens 6 | −3.375 | 0.471 | Glass | 1.699 | 30.2 | −2.73 |
| 14 | | 4.660 | 0.278 | | | | |
| 15 | Lens 7 | 11.998 | 1.129 | Glass | 1.729 | 54.5 | 16.74 |
| 16 | | 670.707 | 1.923 | | | | |
| 17 | Lens 8 | 7.053 ASP | 2.864 | Plastic | 1.514 | 56.8 | 8.17 |
| 18 | | −8.936 ASP | 1.000 | | | | |
| 19 | IR-cut filter | Plano | 0.300 | Glass | 1.517 | 64.2 | — |
| 20 | | Plano | 1.057 | | | | |
| 21 | Image | Plano | — | | | | |

Reference wavelength is 587.6 nm (d-line).
Effective radius of Surface 11 is 1.324 mm.

TABLE 5B

Aspheric Coefficients

| Surface # | 17 | 18 |
|---|---|---|
| k = | 1.6550E−01 | 2.4119E+00 |
| A4 = | 2.8523E−04 | 3.2268E−03 |
| A6 = | 3.1698E−06 | 2.6770E−17 |
| A8 = | −5.1944E−22 | 5.3881E−24 |
| A10 = | −4.3444E−27 | −3.9492E−29 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3A, TABLE 3B, TABLE 4A, TABLE 4B, TABLE 5A and TABLE 5B as the following values and satisfy the following conditions:

2nd Embodiment (Corresponding to TABLE 3A, TABLE 4A, FIG. 3 and FIG. 4)

| HFOVa (deg.) | 92.1 | TLm (mm) | 36.3 |
|---|---|---|---|
| HFOVm (deg.) | 47.3 | |PBFm − PBFa| (μm) | 2.206 |
| FOVa (deg.) | 184.2 | |(Rf − Rr)/(Rf + Rr)| | 0.44 |
| FOVm (deg.) | 94.6 | Dlf (mm) | 19.76 |
| FOVa/FOVm | 1.95 | | |

-continued

2nd Embodiment (Corresponding to TABLE 3A, TABLE 5A, FIG. 3 and FIG. 5)

| HFOVa (deg.) | 92.1 | TLm (mm) | 29.1 |
|---|---|---|---|
| HFOVm (deg.) | 69.9 | |PBFm − PBFa| (μm) | 0.063 |
| FOVa (deg.) | 184.2 | |(Rf − Rr)/(Rf + Rr)| | 0.33 |
| FOVm (deg.) | 139.8 | Dlf (mm) | 22.94 |
| FOVa/FOVm | 1.32 | | |

Figure 6:
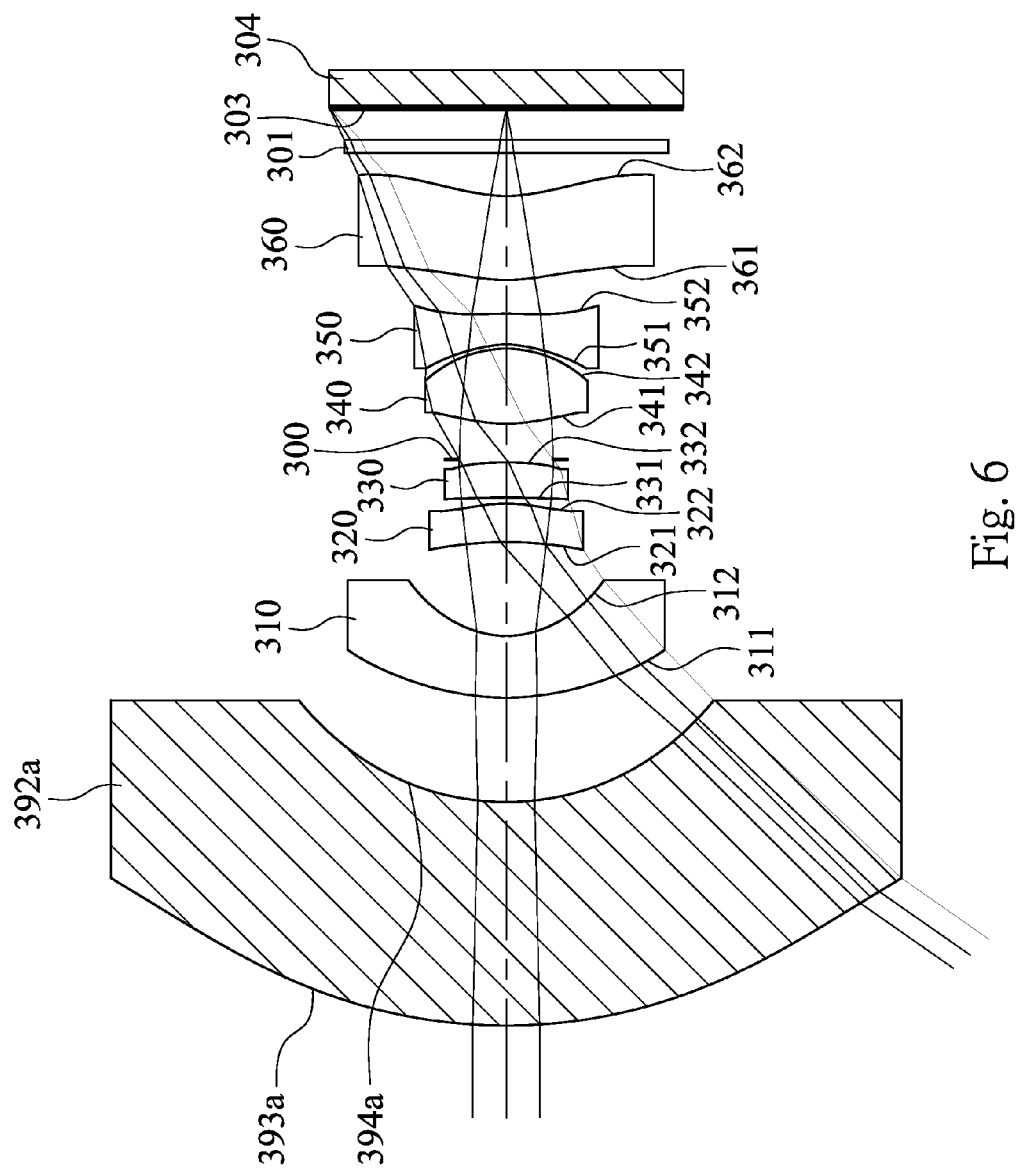
FIG. 6 is a schematic view of an image capturing apparatus applied in air according to the 3rd embodiment of the present disclosure.
Figure 7:
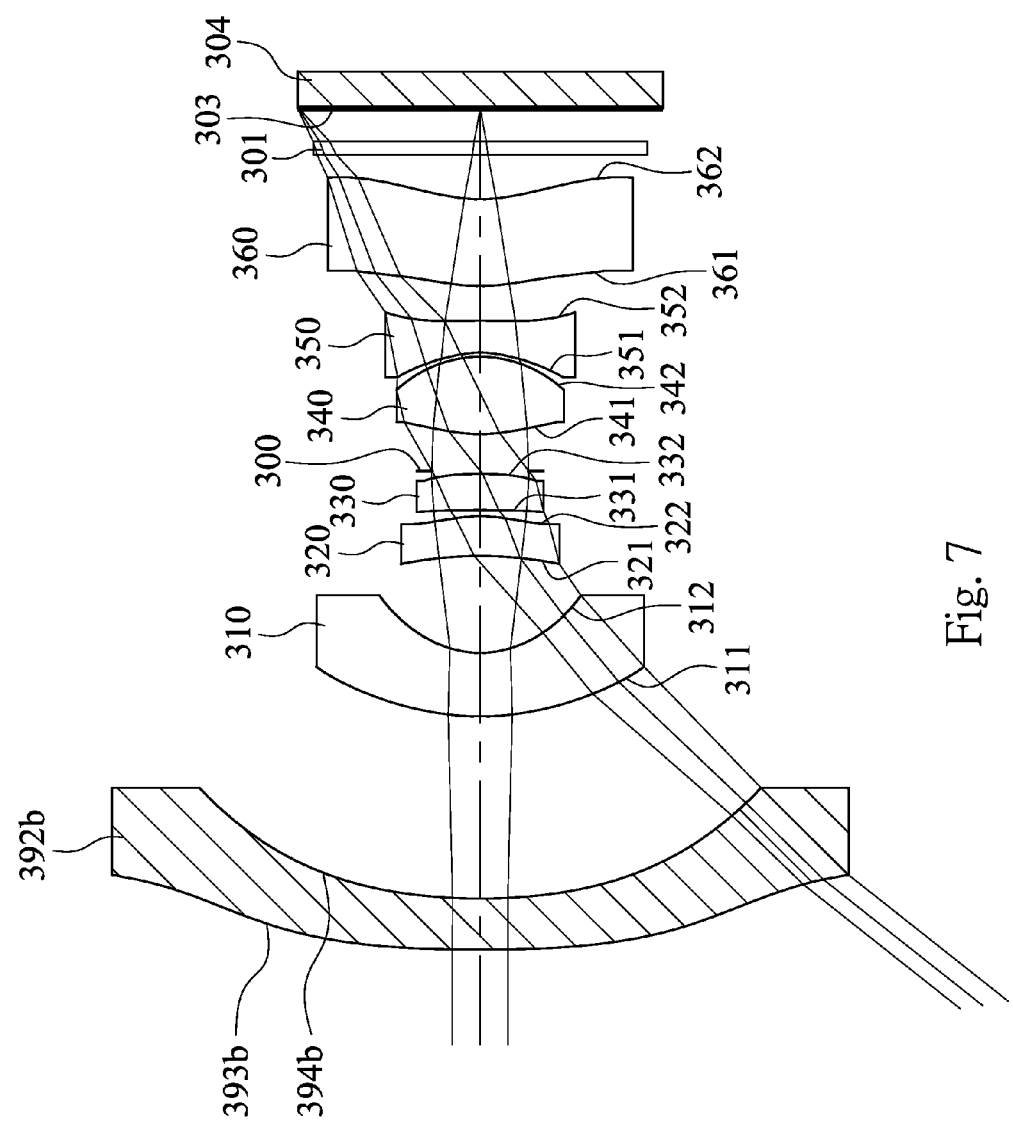
FIG. 7 is a schematic view of the image capturing apparatus applied in the non-air medium according to the 3rd embodiment of the present disclosure.

FIG. 6 is a schematic view of an image capturing apparatus applied in air according to the 3rd embodiment of the present disclosure. FIG. 7 is a schematic view of the image capturing apparatus applied in the non-air medium according to the 3rd embodiment of the present disclosure. The image capturing apparatus according to the 3rd embodiment includes a lens assembly (its reference numeral is omitted), an image sensor 304 and two removable cover lenses 392a, 392b.-

In FIG. 6, when the removable cover lens 392a is disposed on the image capturing apparatus, the image capturing apparatus is applied in air. In FIG. 7, when the removable cover lens 392b is disposed on the image capturing apparatus, wherein the removable cover lens 392a is replaced by the removable cover lens 392b, the image capturing apparatus is applied in the non-air medium. According to the 3rd embodiment, the non-air medium is water.

In details, the lens assembly includes, in order from an object side to an image side, a first lens element 310, a second lens element 320, a third lens element 330, an aperture stop 300, a fourth lens element 340, a fifth lens element 350, a sixth lens element 360, an IR-cut filter 301 and an image surface 303. The image sensor 304 is disposed on the image surface 303 of the lens assembly. The lens assembly has a total of six lens elements (310-360). Moreover, there is an air gap on the optical axis between every two of the first lens element 310, the second lens element 320, the third lens element 330, the fourth lens element 340, the fifth lens element 350 and the sixth lens element 360 that are adjacent to each other. There is no relative movement between the lens elements (310-360) of the lens assembly and the image sensor 304.

The first lens element 310 with negative refractive power has an object-side surface 311 being convex and an image-side surface 312 being concave. The first lens element 310 is made of plastic material and has the object-side surface 311 and the image-side surface 312 being both aspheric.

The second lens element 320 with positive refractive power has an object-side surface 321 being concave and an image-side surface 322 being convex. The second lens element 320 is made of plastic material and has the object-side surface 321 and the image-side surface 322 being both aspheric.

The third lens element 330 with positive refractive power has an object-side surface 331 being concave and an image-side surface 332 being convex. The third lens element 330 is made of plastic material and has the object-side surface 331 and the image-side surface 332 being both aspheric.

The fourth lens element 340 with positive refractive power has an object-side surface 341 being convex and an image-side surface 342 being convex. The fourth lens element 340 is made of plastic material and has the object-side surface 341 and the image-side surface 342 being both aspheric.

The fifth lens element 350 with negative refractive power has an object-side surface 351 being concave and an image-side surface 352 being convex. The fifth lens element 350 is made of plastic material and has the object-side surface 351 and the image-side surface 352 being both aspheric.

The sixth lens element 360 with positive refractive power has an object-side surface 361 being convex and an image-side surface 362 being concave. The sixth lens element 360 is made of plastic material and has the object-side surface 361 and the image-side surface 362 being both aspheric.

The IR-cut filter 301 is made of glass material and located between the sixth lens element 360 and the image surface 303, and will not affect the focal length of the lens assembly.

Furthermore, in FIG. 6, when the image capturing apparatus is applied in air, the removable cover lens 392a is disposed on the object side of the first lens elements 310 (i.e. between the object and the first lens elements 310). The removable cover lens 392a is meniscus and has negative refractive power, an object-side surface 393a being convex and an image-side surface 394a being concave. The removable cover lens 392a is made of plastic material and has the object-side surface 393a and the image-side surface 394a being both aspheric.

In FIG. 7, when the image capturing apparatus is applied in the non-air medium, the removable cover lens 392b is disposed on the object side of the first lens elements 310. The removable cover lens 392b is meniscus and has negative refractive power, an object-side surface 393b being convex and an image-side surface 394b being concave. The removable cover lens 392b is made of plastic material and has the object-side surface 393b and the image-side surface 394b being both aspheric.

The detailed optical data of the 3rd embodiment applied in air corresponding to FIG. 6 is shown in TABLE 6A, and the aspheric surface data is shown in TABLE 6B below. The detailed optical data of the 3rd embodiment applied in the non-air medium corresponding to FIG. 7 is shown in TABLE 7A, and the aspheric surface data is shown in TABLE 7B below.

TABLE 6A

3rd Embodiment Applied in Air
HFOVa = 55.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Removable cover lens | 8.656 | ASP | 3.620 | Plastic | 1.544 | 55.9 | −22.63 |
| 2 | | 4.334 | ASP | 1.688 | | | | |
| 3 | Lens 1 | 4.078 | ASP | 1.000 | Plastic | 1.514 | 56.8 | −5.90 |
| 4 | | 1.593 | ASP | 1.521 | | | | |
| 5 | Lens 2 | −6.455 | ASP | 0.624 | Plastic | 1.544 | 55.9 | 6.29 |
| 6 | | −2.313 | ASP | 0.097 | | | | |
| 7 | Lens 3 | −11.046 | ASP | 0.567 | Plastic | 1.530 | 55.8 | 69.58 |
| 8 | | −8.651 | ASP | 0.050 | | | | |
| 9 | Ape. Stop | Plano | | 0.577 | | | | |
| 10 | Lens 4 | 2.567 | ASP | 1.217 | Plastic | 1.544 | 55.9 | 2.03 |
| 11 | | −1.614 | ASP | 0.066 | | | | |
| 12 | Lens 5 | −1.454 | ASP | 0.500 | Plastic | 1.639 | 23.5 | −2.69 |
| 13 | | −10.809 | ASP | 0.544 | | | | |
| 14 | Lens 6 | 2.666 | ASP | 1.360 | Plastic | 1.544 | 55.9 | 56.62 |
| 15 | | 2.394 | ASP | 0.700 | | | | |

TABLE 6A-continued

3rd Embodiment Applied in Air
HFOVa = 55.0 deg.

| Surface # | | Curvature Radius | Thickness | Material | Index | Abbe # | Focal Length |
|---|---|---|---|---|---|---|---|
| 16 | IR-cut filter | Plano | 0.210 | Glass | 1.517 | 64.2 | — |
| 17 | | Plano | 0.523 | | | | |
| 18 | Image | Plano | — | | | | |

Reference wavelength is 587.6 nm (d-line).
Effective radius of Surface 9 is 0.7585 mm.

TABLE 6B

Aspheric Coefficients

| Surface # | 1 | 2 | 3 | 4 | 5 | 6 | 7 |
|---|---|---|---|---|---|---|---|
| k = | −1.3891E−01 | 4.0300E−01 | −6.8451E−01 | −9.0903E−01 | 1.8694E+01 | −1.0190E+01 | 8.9784E+01 |
| A4 = | 2.4405E−04 | 6.8248E−04 | −6.1203E−03 | 4.4060E−03 | −9.8044E−03 | 1.9516E−02 | 4.8235E−02 |
| A6 = | −8.3909E−06 | −2.3167E−04 | 1.2617E−03 | 2.8437E−03 | 2.6331E−02 | 4.5943E−02 | −8.0865E−03 |
| A8 = | −7.8390E−07 | 2.2280E−05 | −1.5438E−04 | 8.5461E−04 | 2.2363E−03 | −1.8903E−02 | −1.7307E−02 |
| A10 = | 5.9638E−08 | −2.1171E−06 | 1.1190E−05 | −6.0812E−05 | −1.1652E−02 | −6.1007E−03 | 7.9245E−03 |
| A12 = | −1.9372E−09 | 9.1365E−08 | | | 3.4065E−03 | 3.2519E−03 | |
| A14 = | 2.8036E−11 | −2.8794E−09 | | | | | |
| A16 = | −1.4192E−13 | −2.4869E−10 | | | | | |

| Surface # | 8 | 10 | 11 | 12 | 13 | 14 | 15 |
|---|---|---|---|---|---|---|---|
| k = | 3.9760E+01 | −3.0612E+00 | −1.4302E−01 | −4.8796E+00 | 1.1070E+01 | −1.1245E+01 | −3.7482E−01 |
| A4 = | −1.3338E−01 | −4.8184E−02 | 2.0466E−01 | 1.5658E−01 | 7.6183E−02 | −3.5255E−02 | −6.7814E−02 |
| A6 = | 7.3214E−02 | 1.7425E−02 | −3.2922E−01 | −2.8085E−01 | −6.8592E−03 | 1.0145E−02 | 1.6079E−02 |
| A8 = | −3.6081E−02 | −8.7770E−03 | 2.7315E−01 | 2.2347E−01 | −6.6164E−03 | −1.5081E−03 | −3.8075E−03 |
| A10 = | 8.5136E−03 | 2.8522E−03 | −1.1257E−01 | −9.3080E−02 | 2.4028E−03 | 1.5376E−04 | 6.0734E−04 |
| A12 = | | | 1.9077E−02 | 1.5551E−02 | −2.2014E−04 | −6.6936E−06 | −5.9970E−05 |
| A14 = | | | | | −5.5074E−06 | | 2.6373E−06 |

TABLE 7A

3rd Embodiment Applied in the Non-Air Medium
HFOVm = 51.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Removable cover lens | 29.377 | ASP | 0.800 | Plastic | 1.544 | 55.9 | −23.12 |
| 2 | | 8.725 | ASP | 2.862 | | | | |
| 3 | Lens 1 | 4.078 | ASP | 1.000 | Plastic | 1.514 | 56.8 | −5.90 |
| 4 | | 1.593 | ASP | 1.521 | | | | |
| 5 | Lens 2 | −6.455 | ASP | 0.624 | Plastic | 1.544 | 55.9 | 6.29 |
| 6 | | −2.313 | ASP | 0.097 | | | | |
| 7 | Lens 3 | −11.046 | ASP | 0.567 | Plastic | 1.530 | 55.8 | 69.58 |
| 8 | | −8.651 | ASP | 0.050 | | | | |
| 9 | Ape. Stop | Plano | | 0.577 | | | | |
| 10 | Lens 4 | 2.567 | ASP | 1.217 | Plastic | 1.544 | 55.9 | 2.03 |
| 11 | | −1.614 | ASP | 0.066 | | | | |
| 12 | Lens 5 | −1.454 | ASP | 0.500 | Plastic | 1.639 | 23.5 | −2.69 |
| 13 | | −10.809 | ASP | 0.544 | | | | |
| 14 | Lens 6 | 2.666 | ASP | 1.360 | Plastic | 1.544 | 55.9 | 56.62 |
| 15 | | 2.394 | ASP | 0.700 | | | | |
| 16 | IR-cut filter | Plano | | 0.210 | Glass | 1.517 | 64.2 | — |
| 17 | | Plano | | 0.523 | | | | |
| 18 | Image | Plano | | — | | | | |

Reference wavelength is 587.6 nm (d-line).
Effective radius of Surface 9 is 0.7585 mm.

TABLE 7B

Aspheric Coefficients

| Surface # | 1 | 2 | 3 | 4 | 5 | 6 | 7 |
|---|---|---|---|---|---|---|---|
| k = | 1.9593E+01 | 2.3843E+00 | −6.8451E−01 | −9.0903E−01 | 1.8694E+01 | −1.0190E+01 | 8.9784E+01 |
| A4 = | 3.0126E−03 | 1.1774E−03 | −6.1203E−03 | 4.4060E−03 | −9.8044E−03 | 1.9516E−02 | 4.8235E−02 |
| A6 = | −3.0723E−04 | −1.5465E−04 | 1.2617E−03 | 2.8437E−03 | 2.6331E−02 | 4.5943E−02 | −8.0865E−03 |
| A8 = | 3.1247E−05 | 2.6697E−05 | −1.5438E−04 | 8.5461E−04 | 2.2363E−03 | −1.8903E−02 | −1.7307E−02 |
| A10 = | −1.8965E−06 | −2.1478E−06 | 1.1190E−05 | −6.0812E−05 | −1.1652E−02 | −6.1007E−03 | 7.9245E−03 |
| A12 = | 5.9198E−08 | 7.8837E−08 | | | 3.4065E−03 | 3.2519E−03 | |
| A14 = | −9.1670E−10 | −1.2344E−09 | | | | | |
| A16 = | 5.6454E−12 | −9.6726E−14 | | | | | |

| Surface # | 8 | 10 | 11 | 12 | 13 | 14 | 15 |
|---|---|---|---|---|---|---|---|
| k = | 3.9760E+01 | −3.0612E+00 | −1.4302E−01 | −4.8796E+00 | 1.1070E+01 | −1.1245E+01 | −3.7482E−01 |
| A4 = | −1.3338E−01 | −4.8184E−02 | 2.0466E−01 | 1.5658E−01 | 7.6183E−02 | −3.5255E−02 | −6.7814E−02 |
| A6 = | 7.3214E−02 | 1.7425E−02 | −3.2922E−01 | −2.8085E−01 | −6.8592E−03 | 1.0145E−02 | 1.6079E−02 |
| A8 = | −3.6081E−02 | −8.7770E−03 | 2.7315E−01 | 2.2347E−01 | −6.6164E−03 | −1.5081E−03 | −3.8075E−03 |
| A10 = | 8.5136E−03 | 2.8522E−03 | −1.1257E−01 | −9.3080E−02 | 2.4028E−03 | 1.5376E−04 | 6.0734E−04 |
| A12 = | | | 1.9077E−02 | 1.5551E−02 | −2.2014E−04 | −6.6936E−06 | −5.9970E−05 |
| A14 = | | | | | −5.5074E−06 | | 2.6373E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 6A, TABLE 6B, TABLE 7A and TABLE 7B as the following values and satisfy the following conditions:

| 3rd Embodiment | | | |
|---|---|---|---|
| HFOVa (deg.) | 55.0 | TLm (mm) | 13.2 |
| HFOVm (deg.) | 51.6 | |PBFm − PBFa| (μm) | 1.547 |
| FOVa (deg.) | 110.0 | |(Rf − Rr)/(Rf + Rr)| | 0.54 |
| FOVm (deg.) | 103.2 | Dlf (mm) | 11.56 |
| FOVa/FOVm | 1.07 | | |

Figure 8:
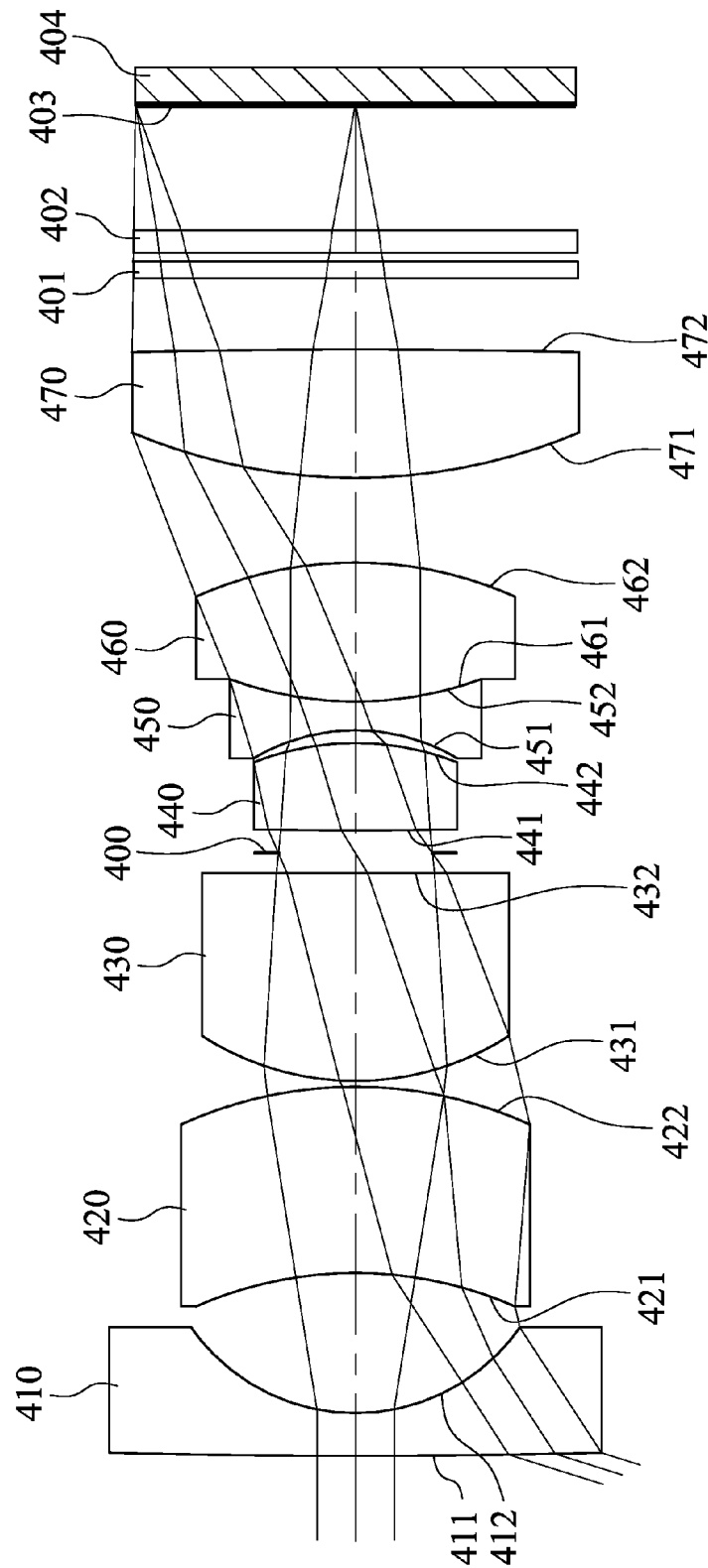
FIG. 8 is a schematic view of an image capturing apparatus applied in air according to the 4th embodiment of the present disclosure.
Figure 9:
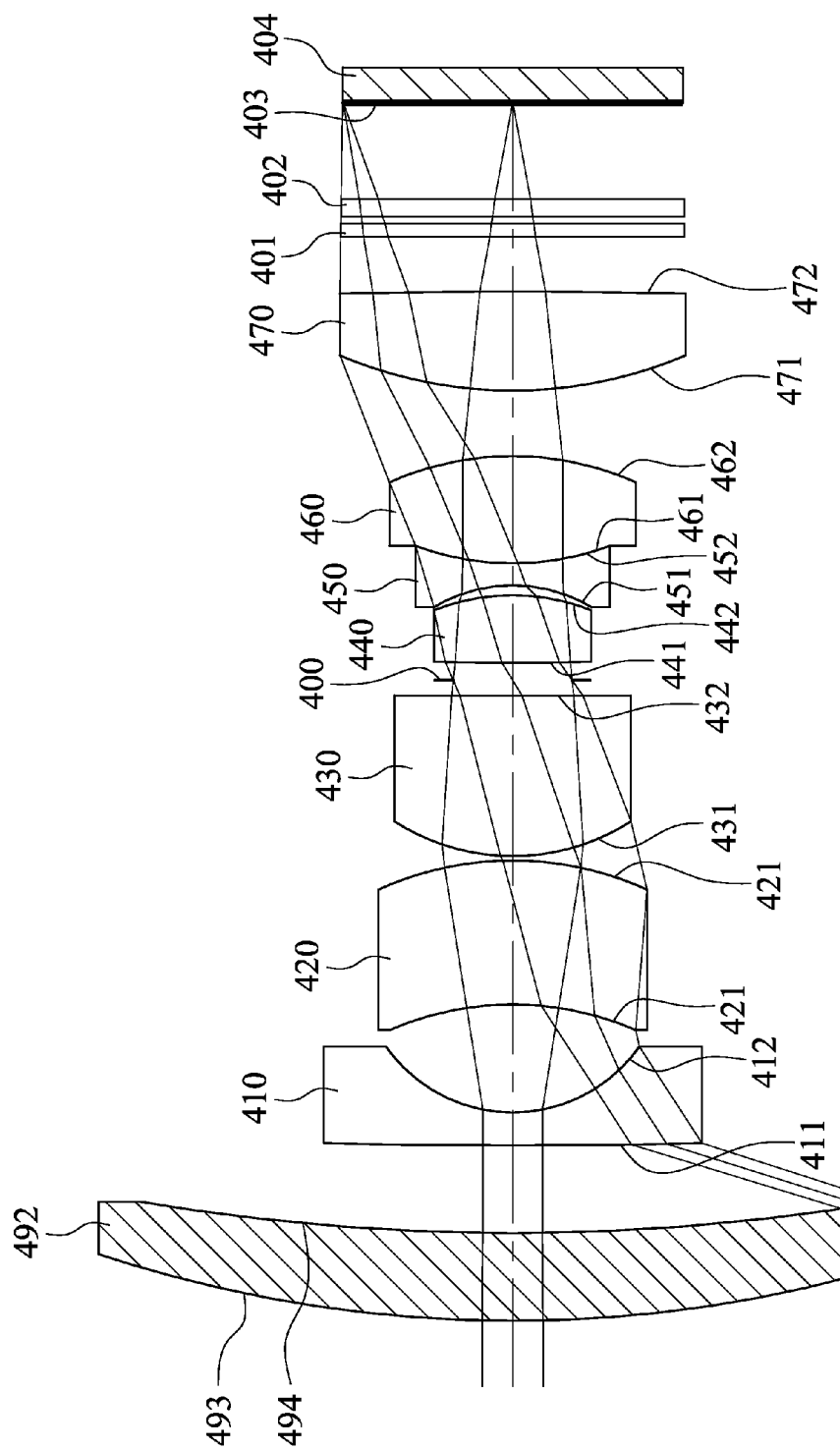
FIG. 9 is a schematic view of the image capturing apparatus applied in the non-air medium according to the 4th embodiment of the present disclosure.

FIG. 8 is a schematic view of an image capturing apparatus applied in air according to the 4th embodiment of the present disclosure. FIG. 9 is a schematic view of the image capturing apparatus applied in the non-air medium according to the 4th embodiment of the present disclosure. The image capturing apparatus according to the 4th embodiment includes a lens assembly (its reference numeral is omitted), an image sensor 404 and a removable cover lens 492.

In FIG. 8, when the removable cover lens 492 is removed from the image capturing apparatus, the lens assembly and the image sensor 404 of the image capturing apparatus are applied in air. In FIG. 9, when the removable cover lens 492 is disposed on the image capturing apparatus, the image capturing apparatus is applied in the non-air medium. According to the 4th embodiment, the non-air medium is water.

In details, the lens assembly includes, in order from an object side to an image side, a first lens element 410, a second lens element 420, a third lens element 430, an aperture stop 400, a fourth lens element 440, a fifth lens element 450, a sixth lens element 460, a seventh lens element 470, an IR-cut filter 401, a cover glass 402 and an image surface 403. The image sensor 404 is disposed on the image surface 403 of the lens assembly. The lens assembly has a total of seven lens elements (410-470). Moreover, there is an air gap on the optical axis between every two of the first lens element 410, the second lens element 420, the third lens element 430, the fourth lens element 440, the fifth lens element 450, the sixth lens element 460 and the seventh lens element 470 that are adjacent to each other. There is no relative movement between the lens elements (410-470) of the lens assembly and the image sensor 404.

The first lens element 410 with negative refractive power has an object-side surface 411 being convex and an image-side surface 412 being concave. The first lens element 410 is made of glass material and has the object-side surface 411 and the image-side surface 412 being both spherical.

The second lens element 420 with positive refractive power has an object-side surface 421 being concave and an image-side surface 422 being convex. The second lens element 420 is made of glass material and has the object-side surface 421 and the image-side surface 422 being both spherical.

The third lens element 430 with positive refractive power has an object-side surface 431 being convex and an image-side surface 432 being planar. The third lens element 430 is made of glass material and has the object-side surface 431 being spherical.

The fourth lens element 440 with positive refractive power has an object-side surface 441 being convex and an image-side surface 442 being convex. The fourth lens element 440 is made of glass material and has the object-side surface 441 and the image-side surface 442 being both spherical.

The fifth lens element 450 with negative refractive power has an object-side surface 451 being concave and an image-side surface 452 being concave. The fifth lens element 450 is made of glass material and has the object-side surface 451 and the image-side surface 452 being both spherical.

The sixth lens element 460 with positive refractive power has an object-side surface 461 being convex and an image-side surface 462 being convex. The sixth lens element 460 is made of glass material and has the object-side surface 461 and the image-side surface 462 being both spherical.

The seventh lens element 470 with positive refractive power has an object-side surface 471 being convex and an image-side surface 472 being convex. The seventh lens element 470 is made of glass material and has the object-side surface 471 and the image-side surface 472 being both spherical.

The IR-cut filter 401 and the cover glass 402 are made of glass material and located between the seventh lens element 470 and the image surface 403 in sequence, and will not affect the focal length of the lens assembly.

Furthermore, in FIG. 9, when the image capturing apparatus is applied in the non-air medium, the removable cover lens 492 is disposed on the object side of the first lens elements 410 (i.e. between the object and the first lens elements 410). The removable cover lens 492 with positive refractive power has an object-side surface 493 being convex and an image-side surface 494 being concave. The removable cover lens 492 is made of glass material and has the object-side surface 493 and the image-side surface 494 being both spherical.

The detailed optical data of the 4th embodiment applied in air corresponding to FIG. 8 is shown in TABLE 8, and the detailed optical data of the 4th embodiment applied in the non-air medium corresponding to FIG. 9 is shown in TABLE 9 below.

TABLE 8

4th Embodiment Applied in Air
HFOVa = 75.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 173.046 | 0.750 | Glass | 1.804 | 46.5 | −4.47 |
| 2 | | 3.518 | 2.468 | | | | |
| 3 | Lens 2 | −6.970 | 3.280 | Glass | 1.801 | 35.0 | 60.91 |
| 4 | | −7.376 | 0.100 | | | | |
| 5 | Lens 3 | 4.980 | 3.660 | Glass | 1.620 | 36.4 | 8.03 |
| 6 | | Plano | 0.350 | | | | |
| 7 | Ape. Stop | Plano | 0.400 | | | | |
| 8 | Lens 4 | 70.464 | 1.540 | Glass | 1.804 | 46.5 | 5.68 |
| 9 | | −4.837 | 0.226 | | | | |
| 10 | Lens 5 | −3.460 | 0.500 | Glass | 1.805 | 25.4 | −2.72 |
| 11 | Lens 6 | 6.323 | 2.450 | Glass | 1.603 | 60.6 | 5.86 |
| 12 | | −6.837 | 1.490 | | | | |
| 13 | Lens 7 | 10.053 | 2.260 | Glass | 1.772 | 49.6 | 12.32 |
| 14 | | −161.168 | 1.250 | | | | |
| 15 | IR-cut filter | Plano | 0.300 | Glass | 1.517 | 64.2 | — |
| 16 | | Plano | 0.150 | | | | |
| 17 | Cover glass | Plano | 0.400 | Glass | 1.517 | 64.2 | — |
| 18 | | Plano | 2.201 | | | | |
| 19 | Image | Plano | — | | | | |

Reference wavelength is 587.6 nm (d-line).
Effective radius of Surface 7 is 1.354 mm.

TABLE 9

4th Embodiment Applied in the Non-Air Medium
HFOVm = 47.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Removable cover lens | 30.000 | 2.000 | Glass | 1.804 | 46.5 | 88.07 |
| 2 | | 50.500 | 2.000 | | | | |
| 3 | Lens 1 | 173.046 | 0.750 | Glass | 1.804 | 46.5 | −4.47 |
| 4 | | 3.518 | 2.468 | | | | |
| 5 | Lens 2 | −6.970 | 3.280 | Glass | 1.801 | 35.0 | 60.91 |
| 6 | | −7.376 | 0.100 | | | | |
| 7 | Lens 3 | 4.980 | 3.660 | Glass | 1.620 | 36.4 | 8.03 |
| 8 | | Plano | 0.350 | | | | |
| 9 | Ape. Stop | Plano | 0.400 | | | | |
| 10 | Lens 4 | 70.464 | 1.540 | Glass | 1.804 | 46.5 | 5.68 |
| 11 | | −4.837 | 0.226 | | | | |
| 12 | Lens 5 | −3.460 | 0.500 | Glass | 1.805 | 25.4 | −2.72 |
| 13 | Lens 6 | 6.323 | 2.450 | Glass | 1.603 | 60.6 | 5.86 |
| 14 | | −6.837 | 1.490 | | | | |
| 15 | Lens 7 | 10.053 | 2.260 | Glass | 1.772 | 49.6 | 12.32 |
| 16 | | −161.168 | 1.250 | | | | |
| 17 | IR-cut filter | Plano | 0.300 | Glass | 1.517 | 64.2 | — |
| 18 | | Plano | 0.150 | | | | |
| 19 | Cover glass | Plano | 0.400 | Glass | 1.517 | 64.2 | — |
| 20 | | Plano | 2.201 | | | | |
| 21 | Image | Plano | — | | | | |

Reference wavelength is 587.6 nm (d-line).
Effective radius of Surface 9 is 1.354 mm.

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 8 and TABLE 9 as the following values and satisfy the following conditions:

| 4th Embodiment | | | |
|---|---|---|---|
| HFOVa (deg.) | 75.6 | TLm (mm) | 27.8 |
| HFOVm (deg.) | 47.0 | |PBFm − PBFa)| (µm) | 0.834 |
| FOVa (deg.) | 151.2 | |(Rf − Rr)/(Rf + Rr)| | 0.25 |
| FOVm (deg.) | 94.0 | Dlf (mm) | 18.87 |
| FOVa/FOVm | 1.61 | | |

Figure 10:
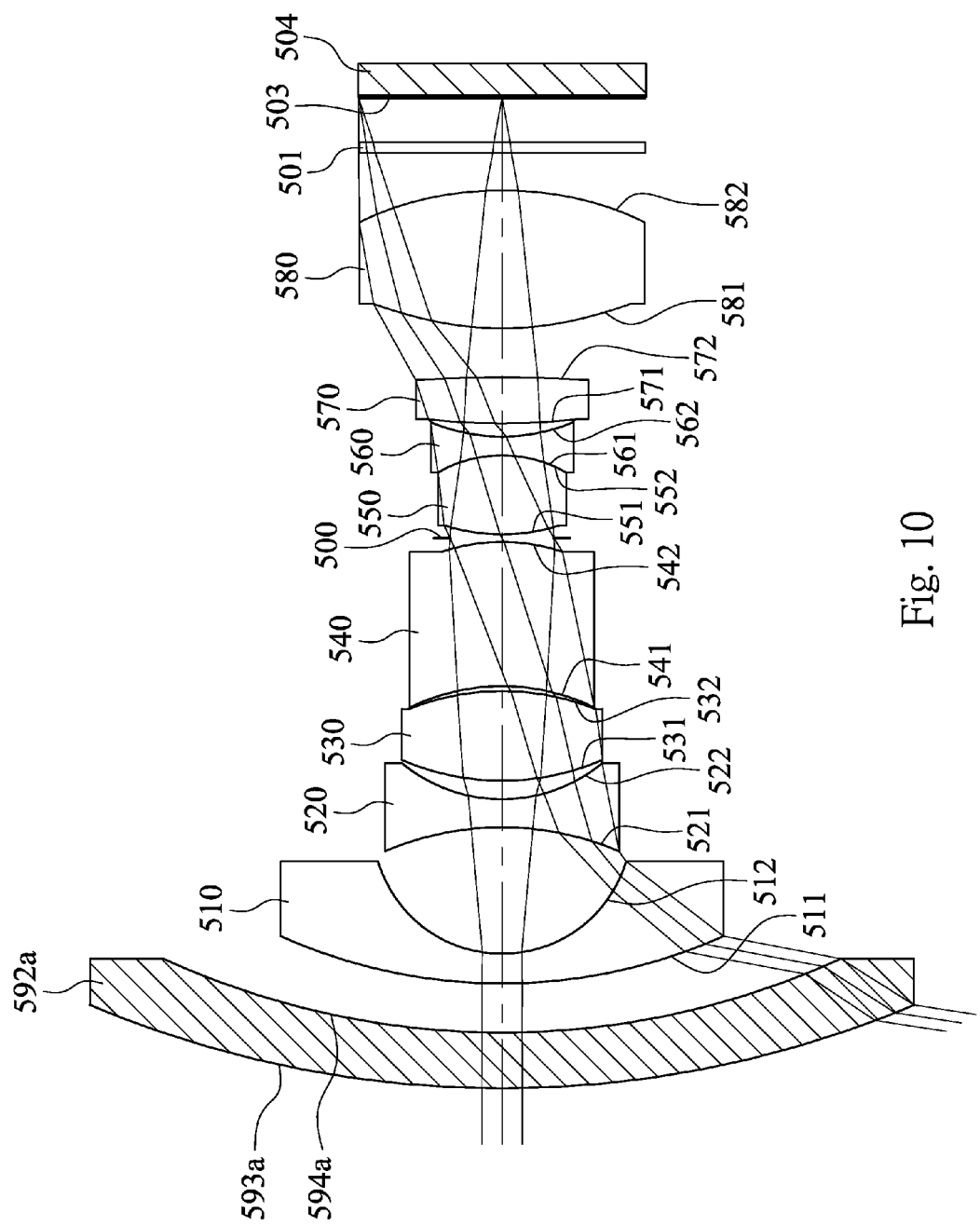
FIG. 10 is a schematic view of an image capturing apparatus applied in air according to the 5th embodiment of the present disclosure.
Figure 11:
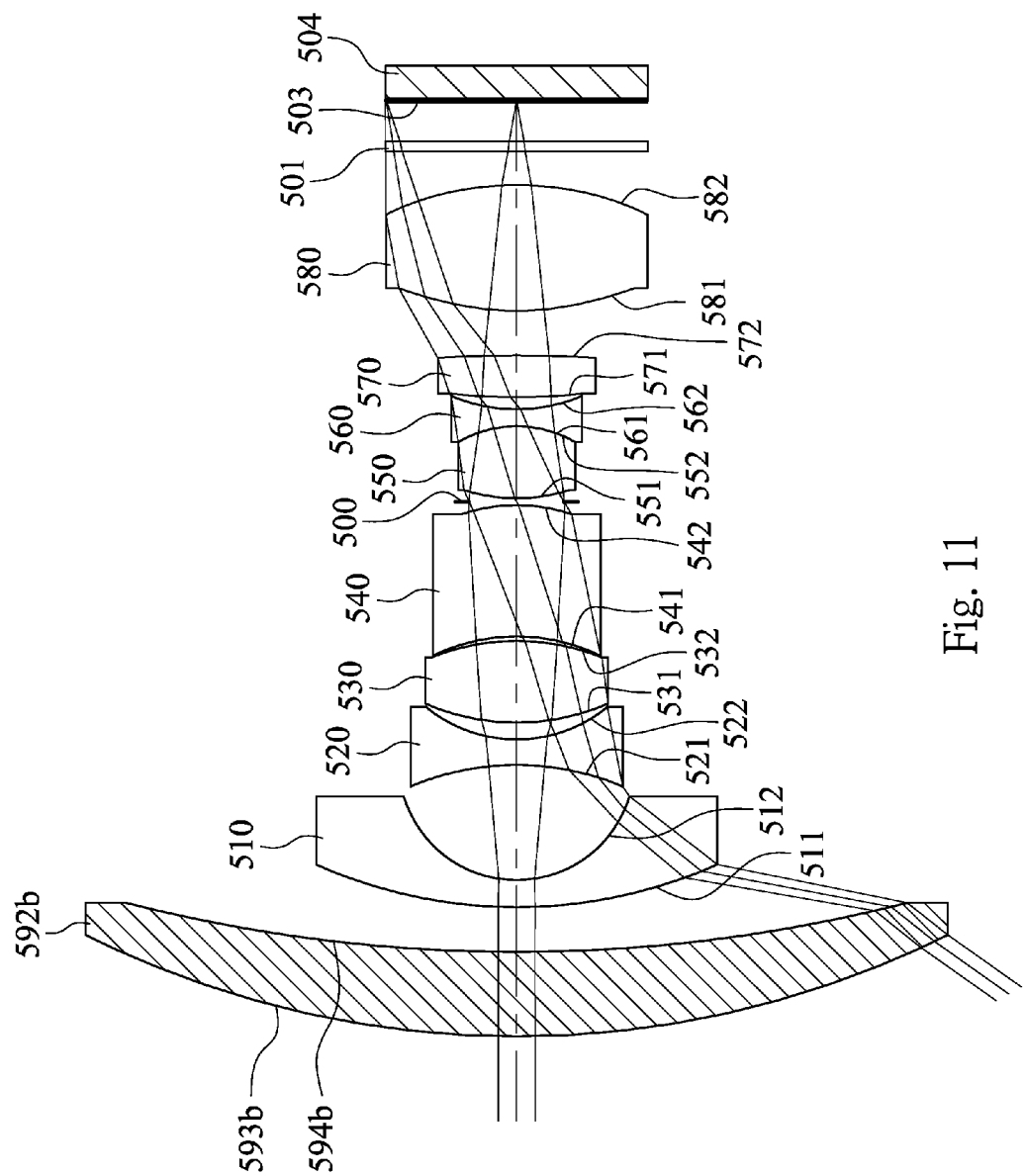
FIG. 11 is a schematic view of the image capturing apparatus applied in the non-air medium according to the 5th embodiment of the present disclosure.

FIG. 10 is a schematic view of an image capturing apparatus applied in air according to the 5th embodiment of the present disclosure. FIG. 11 is a schematic view of the image capturing apparatus applied in the non-air medium according to the 5th embodiment of the present disclosure. The image capturing apparatus according to the 5th embodiment includes a lens assembly (its reference numeral is omitted), an image sensor 504 and two removable cover lenses 592a, 592b.

In FIG. 10, when the removable cover lens 592a is disposed on the image capturing apparatus, the image capturing apparatus is applied in air. In FIG. 11, when the removable cover lens 592b is disposed on the image capturing apparatus, wherein the removable cover lens 592a is replaced by the removable cover lens 592b, the image capturing apparatus is applied in the non-air medium. According to the 5th embodiment, the non-air medium is water.

In details, the lens assembly includes, in order from an object side to an image side, a first lens element 510, a second lens element 520, a third lens element 530, a fourth lens element 540, an aperture stop 500, a fifth lens element 550, a sixth lens element 560, a seventh lens element 570, an eighth lens element 580, an IR-cut filter 501 and an image surface 503. The image sensor 504 is disposed on the image surface 503 of the lens assembly. The lens assembly has a total of eight lens elements (510-580). Moreover, there is no relative movement between the lens elements (510-580) of the lens assembly and the image sensor 504.

The first lens element 510 with negative refractive power has an object-side surface 511 being convex and an image-side surface 512 being concave. The first lens element 510 is made of glass material and has the object-side surface 511 and the image-side surface 512 being both spherical.

The second lens element 520 with negative refractive power has an object-side surface 521 being concave and an image-side surface 522 being concave. The second lens element 520 is made of glass material and has the object-side surface 521 and the image-side surface 522 being both spherical.

The third lens element 530 with positive refractive power has an object-side surface 531 being convex and an image-side surface 532 being convex. The third lens element 530 is made of glass material and has the object-side surface 531 and the image-side surface 532 being both spherical.

The fourth lens element 540 with positive refractive power has an object-side surface 541 being concave and an image-side surface 542 being convex. The fourth lens element 540 is made of glass material and has the object-side surface 541 and the image-side surface 542 being both spherical.

The fifth lens element 550 with positive refractive power has an object-side surface 551 being convex and an image-side surface 552 being convex. The fifth lens element 550 is made of glass material and has the object-side surface 551 and the image-side surface 552 being both spherical.

The sixth lens element 560 with negative refractive power has an object-side surface 561 being concave and an image-side surface 562 being concave. The sixth lens element 560 is made of glass material and has the object-side surface 561 and the image-side surface 262 being both spherical.

The seventh lens element 570 with positive refractive power has an object-side surface 571 being convex and an image-side surface 572 being convex. The seventh lens element 570 is made of glass material and has the object-side surface 571 and the image-side surface 572 being both spherical.

The eighth lens element 580 with positive refractive power has an object-side surface 581 being convex and an image-side surface 582 being convex. The eighth lens element 580 is made of plastic material and has the object-side surface 581 and the image-side surface 582 being both aspheric.

The IR-cut filter 501 is made of glass material and located between the eighth lens element 580 and the image surface 503, and will not affect the focal length of the lens assembly.

Furthermore, in FIG. 10, when the image capturing apparatus is applied in air, the removable cover lens 592a is disposed on the object side of the first lens elements 510 (i.e. between the object and the first lens elements 510). The removable cover lens 592a is meniscus and has negative refractive power, an object-side surface 593a being convex and an image-side surface 594a being concave. The removable cover lens 592a is made of plastic material and has the object-side surface 593a and the image-side surface 594a being both spherical.

In FIG. 11, when the image capturing apparatus is applied in the non-air medium, the removable cover lens 592b is disposed on the object side of the first lens elements 510. The removable cover lens 592b with positive refractive power has an object-side surface 593b being convex and an image-side surface 594b being concave. The removable cover lens 592b is made of plastic material and has the object-side surface 593b and the image-side surface 594b being both spherical.

The detailed optical data of the 5th embodiment applied in air corresponding to FIG. 10 is shown in TABLE 10A, and the aspheric surface data is shown in TABLE 10B below. The detailed optical data of the 5th embodiment applied in the non-air medium corresponding to FIG. 11 is shown in TABLE 11A, and the aspheric surface data is shown in TABLE 11 B below.

TABLE 10A

5th Embodiment Applied in Air
HFOVa = 81.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Removable cover lens | 28.484 | 1.500 | Plastic | 1.491 | 59.9 | −205.40 |
| 2 | | 21.829 | 1.324 | | | | |
| 3 | Lens 1 | 14.540 | 0.800 | Glass | 1.729 | 54.5 | −6.48 |
| 4 | | 3.484 | 3.412 | | | | |
| 5 | Lens 2 | −7.956 | 0.750 | Glass | 1.517 | 64.2 | −5.23 |
| 6 | | 4.221 | 0.496 | | | | |
| 7 | Lens 3 | 6.734 | 2.420 | Glass | 1.834 | 37.3 | 4.40 |
| 8 | | −6.734 | 0.135 | | | | |
| 9 | Lens 4 | −5.596 | 3.881 | Glass | 1.517 | 64.2 | 28.14 |
| 10 | | −4.996 | 0.100 | | | | |
| 11 | Ape. Stop | Plano | 0.100 | | | | |
| 12 | Lens 5 | 5.050 | 2.133 | Glass | 1.603 | 60.6 | 3.74 |
| 13 | Lens 6 | −3.424 | 0.500 | Glass | 1.699 | 30.2 | −2.82 |
| 14 | | 4.924 | 0.358 | | | | |
| 15 | Lens 7 | 18.288 | 1.236 | Glass | 1.729 | 54.5 | 17.16 |
| 16 | | −38.490 | 1.321 | | | | |
| 17 | Lens 8 | 8.467 ASP | 3.717 | Plastic | 1.514 | 56.8 | 9.42 |
| 18 | | −9.596 ASP | 1.000 | | | | |
| 19 | IR-cut filter | Plano | 0.300 | Glass | 1.517 | 64.2 | — |
| 20 | | Plano | 1.218 | | | | |
| 21 | Image | Plano | — | | | | |

Reference wavelength is 587.6 nm (d-line).
Effective radius of Surface 11 is 1.400 mm.

TABLE 10B

Aspheric Coefficients

| Surface # | 17 | 18 |
|---|---|---|
| k = | −9.7317E−01 | 1.9906E+00 |
| A4 = | −3.1359E−04 | 1.2641E−04 |
| A6 = | −1.1772E−16 | 6.4602E−18 |
| A8 = | 1.0499E−22 | −5.5228E−24 |
| A10 = | −2.0882E−27 | −8.8553E−29 |

TABLE 11A

5th Embodiment Applied in the Non-Air Medium
HFOVm = 54.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Removable cover lens | 28.484 | 2.500 | Plastic | 1.491 | 59.9 | 142.95 |
| 2 | | 46.526 | 1.324 | | | | |
| 3 | Lens 1 | 14.540 | 0.800 | Glass | 1.729 | 54.5 | −6.48 |
| 4 | | 3.484 | 3.412 | | | | |
| 5 | Lens 2 | −7.956 | 0.750 | Glass | 1.517 | 64.2 | −5.23 |
| 6 | | 4.221 | 0.496 | | | | |
| 7 | Lens 3 | 6.734 | 2.420 | Glass | 1.834 | 37.3 | 4.40 |
| 8 | | −6.734 | 0.135 | | | | |
| 9 | Lens 4 | −5.596 | 3.881 | Glass | 1.517 | 64.2 | 28.14 |
| 10 | | −4.996 | 0.100 | | | | |
| 11 | Ape. Stop | Plano | 0.100 | | | | |
| 12 | Lens 5 | 5.050 | 2.133 | Glass | 1.603 | 60.6 | 3.74 |
| 13 | Lens 6 | −3.424 | 0.500 | Glass | 1.699 | 30.2 | −2.82 |
| 14 | | 4.924 | 0.358 | | | | |
| 15 | Lens 7 | 18.288 | 1.236 | Glass | 1.729 | 54.5 | 17.16 |
| 16 | | −38.490 | 1.321 | | | | |
| 17 | Lens 8 | 8.467 ASP | 3.717 | Plastic | 1.514 | 56.8 | 9.42 |
| 18 | | −9.596 ASP | 1.000 | | | | |
| 19 | IR-cut filter | Plano | 0.300 | Glass | 1.517 | 64.2 | — |
| 20 | | Plano | 1.205 | | | | |
| 21 | Image | Plano | — | | | | |

Reference wavelength is 587.6 nm (d-line).

TABLE 11B

| Aspheric Coefficients | | |
| --- | --- | --- |
| Surface # | 17 | 18 |
| k = | −9.7317E−01 | 1.9906E+00 |
| A4 = | −3.1359E−04 | 1.2641E−04 |
| A6 = | −1.1772E−16 | 6.4602E−18 |
| A8 = | 1.0499E−22 | −5.5228E−24 |
| A10 = | −2.0882E−27 | −8.8553E−29 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 10A, TABLE 10B, TABLE 11A and TABLE 11B as the following values and satisfy the following conditions:

| 5th Embodiment | | | |
| --- | --- | --- | --- |
| HFOVa (deg.) | 81.3 | TLm (mm) | 27.7 |
| HFOVm (deg.) | 54.7 | |PBFm − PBFa| (μm) | 12.908 |
| FOVa (deg.) | 162.6 | |(Rf − Rr)/(Rf + Rr)| | 0.24 |
| FOVm (deg.) | 109.4 | Dlf (mm) | 25.47 |
| FOVa/FOVm | 1.49 | | |

The foregoing description, for purpose of explanation, has been described with reference to specific embodiments. It is to be noted that TABLES 1A-11B show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing apparatus, which is applied in air or in a non-air medium, comprising:
   a lens assembly comprising at least one lens element;
   an image sensor disposed on an image surface of the lens assembly; and
   a removable cover lens;
   wherein when the image capturing apparatus is applied in air, the lens assembly and the image sensor are disposed along an optical axis in order from an object side to an image side, or the removable cover lens, the lens assembly and the image sensor are disposed along the optical axis in order from the object side to the image side;
   wherein when the image capturing apparatus is applied in the non-air medium, the removable cover lens, the lens assembly and the image sensor are disposed along the optical axis in order from the object side to the image side;
   wherein when the image capturing apparatus is applied in the non-air medium, an axial distance between an object-side surface of the removable cover lens and the image sensor is TLm, a back focal length of the image capturing apparatus applied in the non-air medium is PBFm, a back focal length of the image capturing apparatus applied in air is PBFa, and the following conditions are satisfied:

$TLm < 40$ mm; and $|(PBFm - PBFa)| < 7$ μm.

2. The image capturing apparatus of claim 1, wherein when the image capturing apparatus is applied in the non-air medium, the axial distance between the object-side surface of the removable cover lens and the image sensor is TLm, and the following condition is satisfied:

$1$ mm $< TLm < 20$ mm.

3. The image capturing apparatus of claim 1, wherein the back focal length of the image capturing apparatus applied in the non-air medium is PBFm, the back focal length of the image capturing apparatus applied in air is PBFa, and the following condition is satisfied:

$|(PBFm - PBFa)| < 5$ μm.

4. The image capturing apparatus of claim 1, wherein a maximal field of view of the image capturing apparatus applied in air is FOVa, a maximal field of view of the image capturing apparatus applied in the non-air medium is FOVm, and the following condition is satisfied:

$1.20 < FOVa/FOVm$.

5. The image capturing apparatus of claim 1, wherein the maximal field of view of the image capturing apparatus applied in air is FOVa, and the following condition is satisfied:

$100$ degrees $< FOVa$.

6. The image capturing apparatus of claim 1, wherein a maximum effective diameter of the object-side surface of the removable cover lens is Dlf, and the following condition is satisfied:

$Dlf < 35$ mm.

7. The image capturing apparatus of claim 1, wherein there are at least four and no more than nine lens elements in the lens assembly.

8. The image capturing apparatus of claim 1, wherein there is no relative movement between the at least one lens element of the lens assembly and the image sensor.

9. An image capturing apparatus, which is applied in a non-air medium, comprising:
   a lens assembly comprising at least one lens element;
   an image sensor disposed on an image surface of the lens assembly; and
   a housing, wherein the lens assembly and the image sensor are disposed in the housing, and the housing comprises:
      a housing body;
      at least one removable cover lens, wherein the removable cover lens, the lens assembly and the image sensor are disposed along an optical axis in order from an object side to an image side; and
      an airtight seal for connecting the housing body and the removable cover lens;
   wherein when the image capturing apparatus is applied in the non-air medium, an axial distance between an object-side surface of the removable cover lens and the image sensor is TLm, a curvature radius of the object-side surface of the removable cover lens is Rf, a curvature radius of an image-side surface of the removable cover lens is Rr, and the following conditions are satisfied:

$TLm<40$ mm; and $0.1<|(Rf-Rr)/(Rf+Rr)|$.

10. The image capturing apparatus of claim 9, wherein a maximum effective diameter of the object-side surface of the removable cover lens is Dlf, and the following condition is satisfied:

$Dlf<35$ mm.

11. The image capturing apparatus of claim 9, wherein the airtight seal comprises a locking mechanism.

12. The image capturing apparatus of claim 9, wherein the removable cover lens has positive refractive power.

13. The image capturing apparatus of claim 12, wherein when the removable cover lens is removed from the image capturing apparatus, the lens assembly and the image sensor of the image capturing apparatus are applied in air.

14. The image capturing apparatus of claim 9, wherein at least two removable cover lenses, which are interchangeable, are able to connect to the housing body.

15. The image capturing apparatus of claim 14, wherein at least one of the removable cover lenses is meniscus and has negative refractive power.

16. The image capturing apparatus of claim 9, wherein the image capturing apparatus is further applied in air, with an axial distance between the removable cover lens and the lens assembly applied in air different from an axial distance between the removable cover lens and the lens assembly applied in the non-air medium.

17. The image capturing apparatus of claim 9, wherein the removable cover lens is made of plastic material.

18. The image capturing apparatus of claim 9, wherein there is no relative movement between the at least one lens element of the lens assembly and the image sensor.

19. The image capturing apparatus of claim 9, wherein the non-air medium is water.

20. The image capturing apparatus of claim 9, wherein the image capturing apparatus is further applied in air, a maximal field of view of the image capturing apparatus applied in air is FOVa, a maximal field of view of the image capturing apparatus applied in the non-air medium is FOVm, and the following condition is satisfied:

$1.20<FOVa/FOVm$.

21. The image capturing apparatus of claim 9, wherein the image capturing apparatus is further applied in air, a maximal field of view of the image capturing apparatus applied in air is FOVa, and the following condition is satisfied:

100 degrees$<FOVa$.

22. The image capturing apparatus of claim 9, wherein when the image capturing apparatus is applied in the non-air medium, the axial distance between the object-side surface of the removable cover lens and the image sensor is TLm, and the following condition is satisfied:

1 mm$<TLm<20$ mm.

23. The image capturing apparatus of claim 12, wherein the image capturing apparatus is further applied in air, a back focal length of the image capturing apparatus applied in the non-air medium is PBFm, a back focal length of the image capturing apparatus applied in air is PBFa, and the following condition is satisfied:

$|(PBFm-PBFa)|<7$ μm.

24. The image capturing apparatus of claim 9, wherein the image capturing apparatus further comprises an optical image stabilization system.

25. The image capturing apparatus of claim 9, wherein there are at least two lens elements in the lens assembly, and at least one of the lens elements is made of glass material.

26. The image capturing apparatus of claim 9, wherein there are at least three and no more than seven lens elements in the lens assembly.

27. The image capturing apparatus of claim 9, wherein the airtight seal comprises an o-ring.

28. The image capturing apparatus of claim 9, wherein the removable cover lens connected to the housing body is adjustable along the optical axis.

* * * * *